(12) United States Patent
Ishii et al.

(10) Patent No.: US 10,427,748 B2
(45) Date of Patent: Oct. 1, 2019

(54) STEERED WHEEL SUPPORT STRUCTURE OF VEHICLE

(71) Applicant: KAWASAKI JUKOGYO KABUSHIKI KAISHA, Kobe-shi, Hyogo (JP)

(72) Inventors: Hiroshi Ishii, Kobe (JP); Masato Kogirima, Kobe (JP)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 136 days.

(21) Appl. No.: 15/868,842

(22) Filed: Jan. 11, 2018

(65) Prior Publication Data

US 2018/0194427 A1  Jul. 12, 2018

(30) Foreign Application Priority Data

Jan. 12, 2017  (JP) .................................. 2017-003033

(51) Int. Cl.
*B62K 21/00* (2006.01)
*B62D 7/18* (2006.01)
(Continued)

(52) U.S. Cl.
CPC ............ *B62K 21/005* (2013.01); *B60G 3/207* (2013.01); *B62D 7/18* (2013.01); *B62D 7/20* (2013.01);
(Continued)

(58) Field of Classification Search
CPC ...... B62K 21/005; B62K 25/04; B62K 25/16; B60G 3/207; B60G 2206/50;
(Continued)

(56) References Cited

U.S. PATENT DOCUMENTS

| 1,372,883 A | * | 3/1921 | Kanik | ...................... | B62D 7/18 |
| | | | | | 280/93.512 |
| 1,705,630 A | * | 3/1929 | Woolson | .................. | B62D 7/18 |
| | | | | | 280/93.512 |

(Continued)

FOREIGN PATENT DOCUMENTS

JP  2002029481 A  1/2002

*Primary Examiner* — Faye M Fleming
(74) *Attorney, Agent, or Firm* — Alleman Hall Creasman & Tuttle LLP

(57) ABSTRACT

A steered wheel support structure of a vehicle, includes a knuckle member which supports an axle of a steered wheel and a support member which is coupled to a vehicle body and supports the knuckle member from a first side in a vehicle width direction in such a manner that the knuckle member is angularly displaceable around a steering axis line, the knuckle member includes: an axle support section which supports the axle; and two supported sections disposed on both sides in the upward and downward direction, of at least a portion of the axle support section, the two supported sections facing each other and being apart from each other in the upward and downward direction, and the two supported sections are supported by the support member in such a manner that the two supported sections are angularly displaceable around the steering axis line relative to the support member.

8 Claims, 8 Drawing Sheets

(51) Int. Cl.
    *B62D 7/20*          (2006.01)
    *B62K 25/04*        (2006.01)
    *B60G 3/20*          (2006.01)
    *B62K 25/16*        (2006.01)

(52) U.S. Cl.
    CPC .............. *B62K 25/04* (2013.01); *B62K 25/16* (2013.01); *B60G 2200/44* (2013.01); *B60G 2206/50* (2013.01); *B60G 2300/12* (2013.01)

(58) Field of Classification Search
    CPC .. B60G 2200/44; B60G 2300/12; B62D 7/18; B62D 7/20
    See application file for complete search history.

(56) References Cited

U.S. PATENT DOCUMENTS

| | | | |
|---|---|---|---|
| 7,044,252 B1 * | 5/2006 | Bertrand | B62K 11/06 180/219 |
| 2005/0073123 A1 * | 4/2005 | Kapaan | B62D 7/18 280/93.512 |

\* cited by examiner

STEERED WHEEL SUPPORT STRUCTURE OF VEHICLE

CROSS-REFERENCE TO THE RELATED APPLICATION

This application claims priority to and the benefit of Japanese Patent Application No. 2017-003033 filed on Jan. 12, 2017, the entire disclosure of which is incorporated herein by reference.

BACKGROUND OF THE INVENTION

Field of the Invention

The present invention relates to a steered wheel support structure of a vehicle.

Description of the Related Art

Japanese Laid-Open Patent Application Publication No. 2002-29481 discloses a straddle (straddle-type) vehicle of a hub steering type, in which a steering bearing is disposed at a hub position that is radially inward of a front wheel. In this straddle vehicle, a holder block as a knuckle member supporting the front wheel in such a manner that the front wheel is rotatable is coupled to an arm member via the steering bearing. The front wheel is supported by the arm member, together with the holder block, in such a manner that the front wheel is angularly displaceable around a steering axis line.

In this straddle vehicle, as the size of the steering bearing increases, the size of the knuckle member increases correspondingly. With an increase in the size of the knuckle member, it is necessary to prevent interference between the knuckle member and other members disposed in a space which is radially inward of the front wheel. This leads to reduction of flexibility with which the straddle vehicle is designed.

SUMMARY OF THE INVENTION

In view of the above-described circumstances, an object of the present invention is to prevent an increase in the size of a knuckle member in a steered wheel support structure of a vehicle of a hub steering type.

To achieve the above-described object, the present invention provides a steered wheel support structure of a vehicle, the steered wheel support structure comprising: a knuckle member which supports an axle of a steered wheel in such a manner that the axle is rotatable around an axle line; and a support member which is coupled to a vehicle body and supports the knuckle member from a first side in a vehicle width direction in such a manner that the knuckle member is angularly displaceable around a steering axis line extending in an upward and downward direction, wherein the knuckle member includes: an axle support section which supports the axle; and two supported sections which are disposed on both sides in the upward and downward direction, of at least a portion of the axle support section, the two supported sections facing each other and being spaced apart from each other in the upward and downward direction, and wherein the two supported sections are supported by the support member in such a manner that the two supported sections are angularly displaceable around the steering axis line relative to the support member.

In accordance with this configuration, the two supported sections of the knuckle member are disposed on both sides in the upward and downward direction, of at least a portion of the axle support section in such a manner that the supported sections are spaced apart from each other and face each other in the upward and downward direction. Therefore, the two supported sections are disposed to face a portion of the axle of the steered wheel, namely, to overlap with a portion of the axle in the forward and rearward direction, when viewed from the upward and downward direction. Since the two supported sections are disposed to face a portion of the axle of the front wheel, it becomes possible to reduce the protruding amount of the two supported sections from the axle in the forward and rearward direction. Therefore, it becomes possible to prevent an increase in the size of the knuckle member in the radial direction of the steered wheel, and make the knuckle member compact.

The two supported sections may include an upper supported section and a lower supported section, the upper supported section may extend upward from the axle support section along the steering axis line, the lower supported section may extend downward from the axle support section along the steering axis line, and the upper supported section and the lower supported section may be supported by the support member by use of bearings, respectively, which are placed coaxially with the steering axis line in such a manner that the upper supported section and the lower supported section are angularly displaceable around the steering axis line.

In accordance with this configuration, the upper supported section extends upward from the axle support section, and the lower supported section extends downward from the axle support section. This makes it possible to prevent the contour of the knuckle member from being radially away from the axle, and to reduce the size of the knuckle member, compared to a case where the upper supported section and the lower supported section extend in the upward and downward direction, from locations that are away (distant) in the forward and rearward direction from the axle support section.

At least one of the two supported sections may be removably mounted on the axle support section. In accordance with this configuration, the knuckle member can be formed more easily than in a case where both of the two supported sections are integrated with the axle support section.

The knuckle member may include at least one section into which at least one of the two supported sections is insertable in a steering axis line direction. In accordance with this configuration, since at least one of the two supported sections is inserted into the insertion section in the steering axis line direction, the supported section can be mounted on the axle support section in a state in which the supported section inserted into the insertion section is positioned. Therefore, an assembling work for the knuckle member can be easily performed.

A displacement inhibiting element may be attached on the knuckle member, from a second side in the vehicle width direction to inhibit at least one of the two supported sections mounted on the axle support section from being displaced with respect to the axle support section.

In accordance with this configuration, a work for inhibiting at least one of the two supported sections from being displaced with respect to the axle support section can be easily performed, while preventing interference with the support member.

The steered wheel support structure of the vehicle may further comprise a rotary component coupling member including an axle coupling section coupled to the axle, and a rotary component coupling section to which a rotary component rotatable around the axle line together with the axle is coupled, the rotary component coupling section being connected to the axle coupling section, and the two supported sections may be disposed inward in a radial direction of the axle, relative to the rotary component coupling member and the rotary component.

In accordance with this configuration, since the two supported sections are disposed inward in the radial direction of the axle, relative to the rotary component coupling member and the rotary component, it becomes possible to prevent the supported sections from interfering with the rotary component coupling member and the rotary component.

The support member may support the knuckle member in a cantilever manner from the first side in the vehicle width direction, the rotary component coupling member may include a steered wheel coupling section to which the steered wheel is coupled, and the steered wheel may be removably coupled to the steered wheel coupling section, from the second side in the vehicle width direction.

In accordance with this configuration, since the steered wheel is removably coupled to the steered wheel coupling section, from a side opposite to a side where the support member is located, a work for mounting and dismounting (detaching) the steered wheel can be easily performed while preventing interference with the support member.

The knuckle member may include an angular displacement member coupling section to which an angular displacement member is coupled, the angular displacement member being angularly displaceable around the steering axis line together with the knuckle member, and the angular displacement member coupling section may extend from the axle support section to the first side in the vehicle width direction.

In accordance with this configuration, since the angular displacement member coupling section extends from the axle support section to the first side in the vehicle width direction, a work for mounting and dismounting (detaching) the steered wheel can be easily performed while preventing interference with the angular displacement member.

In accordance with the inventions described above, it becomes possible to prevent an increase in the size of the knuckle member in a steered wheel support structure of a vehicle of a hub steering type.

The above and further objects, features and advantages of the present invention will more fully be apparent from the following detailed description of preferred embodiment with reference to the accompanying drawings.

DETAILED DESCRIPTION OF THE EMBODIMENTS

Embodiment

Hereinafter, the embodiment of the present invention will be described with reference to the drawings. Throughout the drawings, the same or corresponding constituents are designated by the same reference symbols, and will not be described repeatedly. The stated directions are from the perspective of a rider straddling a motorcycle 1. Also, a first side (one side) in a vehicle width direction and a first side in a direction of an axle line Q (axle line Q direction) correspond with the left side of the motorcycle 1, and a second side (the other side) in the vehicle width direction and a second side in the axle line Q direction correspond with the right side of the motorcycle 1.

[Front Wheel Support Structure of Motorcycle]

Figure 1:
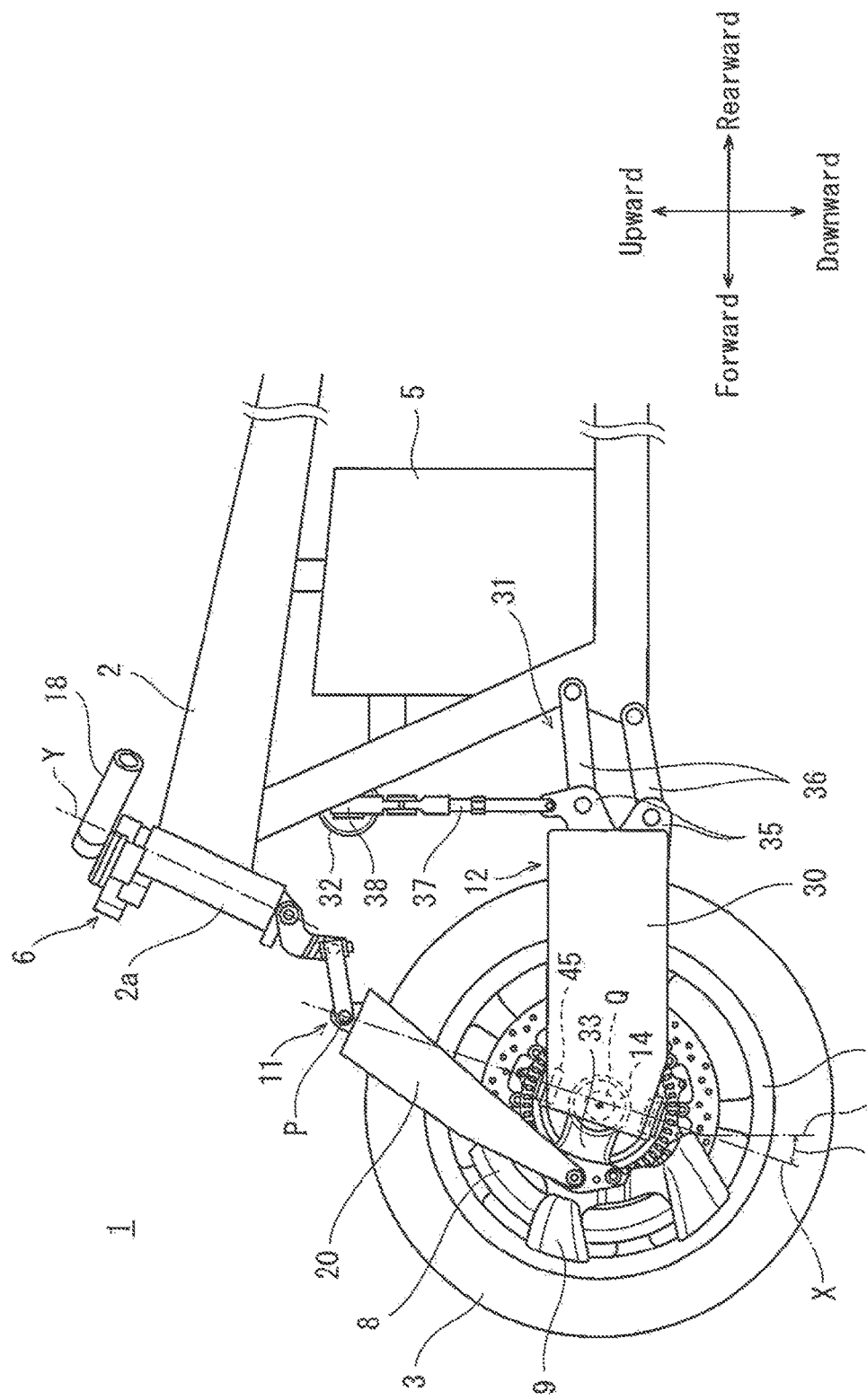
FIG. 1 is a left side view showing main constituents of a motorcycle according to one embodiment of the present invention.

FIG. 1 is a left side view showing main constituents of the motorcycle 1 according to one embodiment of the present invention. The motorcycle 1 is an example of a straddle vehicle (straddle-type vehicle) which is steered by the rider straddling a seat. In the present embodiment, the motorcycle 1 includes a front wheel 3 which is a steered wheel, a rear wheel which is a drive wheel, and a driving power source 5 which generates driving power provided to the drive wheel to allow the motorcycle 1 to travel. The motorcycle 1 further includes a vehicle body 2 which supports the front and rear wheels, and the driving power source 5. The vehicle body 2 supports the front wheel 3 at its front part, and the rear wheel at its rear part, and extends in a forward and rearward direction. The vehicle body 2 supports the driving power source 5 at a location that is between the front and rear wheels. The vehicle body 2 is provided with a seat placed at a location that is above the driving power source 5 and between the front and rear wheels. In the present embodiment, the driving power source 5 is an engine for allowing the motorcycle 1 to travel.

The vehicle body 2 supports an axle 14 of the front wheel 3. The vehicle body 2 supports the front wheel 3 in such a manner that the front wheel 3 is angularly displaceable around a steering axis line X extending upward and downward (in an upward and downward direction). During traveling (driving) of the motorcycle 1, the front wheel 3 is steered by the rider so that it is angularly displaced around the steering axis line X. In this way, a traveling direction of the motorcycle 1 is changed.

In the present embodiment, the motorcycle 1 has a front wheel support structure 12 for supporting the front wheel 3 in such a manner that the front wheel 3 is movable in the upward and downward direction and is suspended from the vehicle body 2. The front wheel support structure 12 is of a hub steering type. Specifically, a pair of steering bearings (upper and lower steering bearings) 45 used to support the axle 14 in such a manner that the axle 14 can be steered. The steering bearings 45 are disposed radially inward of the outer peripheral surface of the front wheel 3.

The front wheel support structure 12 includes a knuckle member 33 and a support member 30. The knuckle member 33 supports the axle 14 of the front wheel 3 in such a manner that the axle 14 is rotatable around the axle line Q. The support member 30 is coupled to the vehicle body 2. The support member 30 supports the knuckle member 33 in such a manner that the knuckle member 33 is angularly displaceable around the steering axis line X. In the present embodiment, the support member 30 supports the knuckle member 33 in a cantilever manner, from the first side in the vehicle width direction. The knuckle member 33 is disposed radially inward of the outer peripheral surface of the front wheel 3, when viewed from the vehicle width direction of the front wheel 3.

The support member 30 is indirectly coupled to the vehicle body 2 via a pair of link mechanisms 31 included in the front wheel support structure 12. The support member 30 is elongated and extends in the forward and rearward direction. The support member 30 supports the knuckle member 33 at its front end portion and is coupled to the link mechanism 31 at its rear end portion. The rear end portion of the support member 30 is coupled to the link mechanism 31 in such a manner that the support member 30 is rotatable (pivotable) around a pivot axis line set in the vehicle body 2 and extending in the vehicle width direction. In this configuration, the front end portion of the support member 30 and the knuckle member 33 supported by the front end portion of the support member 30 are movable in the upward and downward direction, relative to the vehicle body 2.

The front end portion of the support member 30 extends in parallel with and along the steering axis line X. This structure makes it possible to prevent a situation in which the support member 30 interferes with an upward/downward extension portion 33q (described later) of the knuckle member 33 during steering of the front wheel 3.

The steering axis line X is set with respect to the support member 30. The steering axis line X extends in a direction including a vertical direction. In the present embodiment, the steering axis line X is inclined in the forward and rearward direction with respect to the vertical direction. Specifically, the steering axis line X is inclined at an angle θ with respect to a vertical line Z so that the steering axis line X extends in a rearward direction as it extends in an upward direction. Since the steering axis line X is set with respect to the support member 30, the steering axis line X is displaced relative to the vehicle body 2, according to the displacement of the support member 30 relative to the vehicle body 2.

Figure 2:
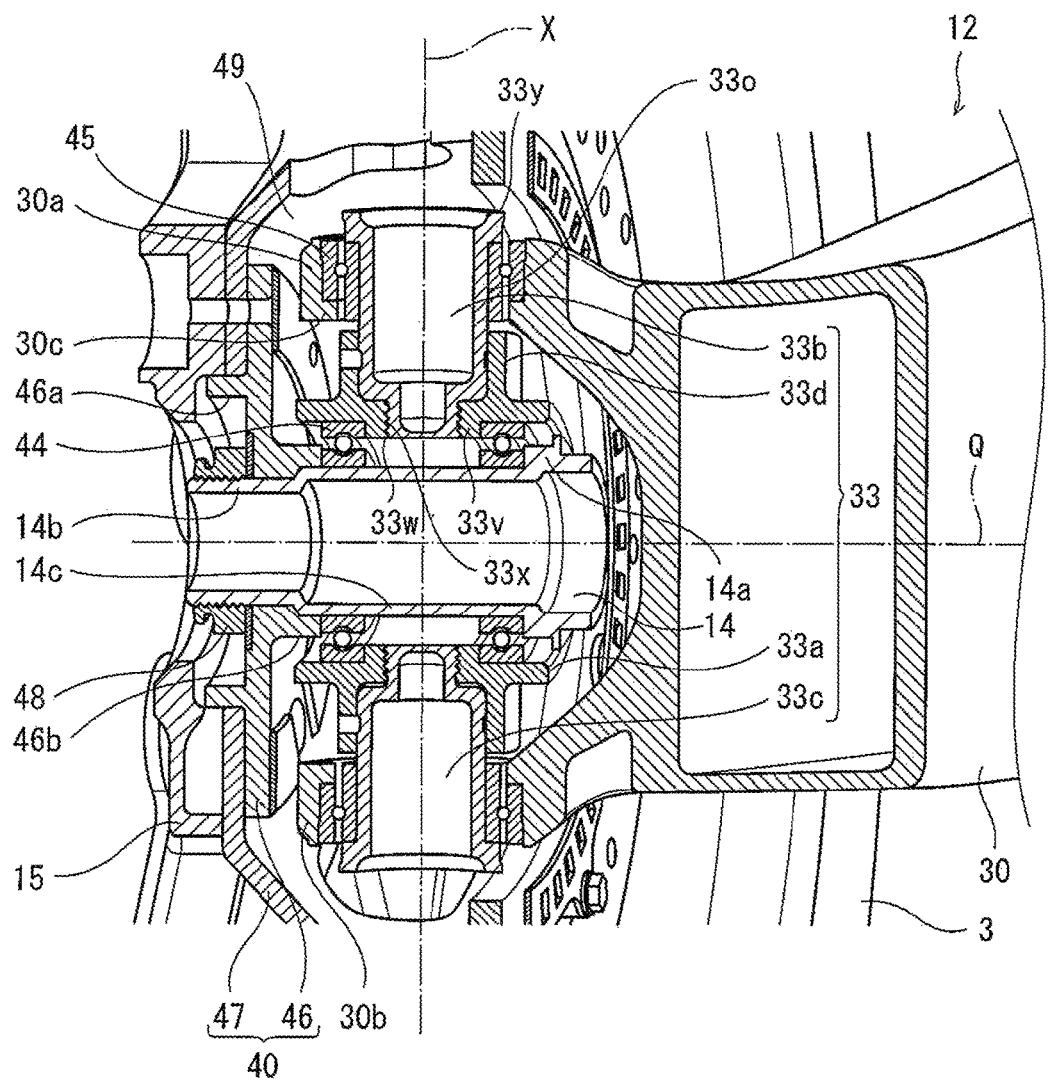
FIG. 2 is a cross-sectional view showing a front wheel support structure which is taken along a plane including a steering axis line and an axle line of FIG. 1.
Figure 2:
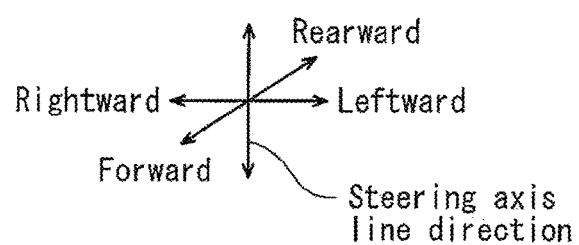

FIG. 2 is a cross-sectional view showing the front wheel support structure 12 which is taken along a plane including the steering axis line X and the axle line Q of FIG. 1. As shown in FIG. 2, the pair of steering bearings 45 are interposed between the knuckle member 33 and the support member 30. This allows the knuckle member 33 to be supported by the support member 30 in such a manner that the knuckle member 33 is angularly displaceable around the steering axis line X, relative to the support member 30. Also, a pair of axle supporting bearings 44 (hereinafter will be referred to as axle bearings 44) are interposed between the axle 14 and the knuckle member 33. This allows the axle 14 to be supported by the knuckle member 33 in such a manner that the axle 14 is rotatable around the axle line Q.

The axle line Q is set with respect to the knuckle member 33. Thus, according to the displacement of the knuckle member 33 relative to the vehicle body 2, the axle line Q is displaced relative to the vehicle body 2. Therefore, the axle line Q is angularly displaced relative to the vehicle body 2 according to the angular displacement of the knuckle member 33 around the steering axis line X, and thus the direction of the front wheel 3 coupled to the axle 14 around the steering axis line X is changed. The knuckle member 33 is angularly displaced around the steering axis line X by steering torque transmitted from the rider to a steering mechanism 11 (described later).

Steering members such as the knuckle member 33 and the axle 14 are angularly displaced around the steering axis line X, and their directions around the steering axis line X are changed. Hereinafter, a state in which the axle line Q is parallel to the vehicle width direction (e.g., straight-forward traveling state) will be described, unless otherwise noted. For example, the forward and rearward direction is defined as a forward and rearward direction in a state in which the axle 14 of the front wheel 3 extends in the vehicle width direction. The direction parallel to the steering axis line X will be referred to as the direction of the steering axis line X (steering axis line X direction). The extending direction of the axle 14 will be referred to as the direction of the axle line Q (axle line Q direction).

A pair of protruding sections 30a, 30b (upper protruding section 30a, lower protruding section 30b) protruding inward in the vehicle width direction from the remaining portion of the support member 30 are provided at the tip end portion of the support member 30. The pair of protruding sections 30a, 30b serve to support the knuckle member 33. The pair of protruding sections 30a, 30b are spaced apart from each other in the steering axis line X direction. The steering axis line X is set to pass through the upper and lower protruding sections 30a, 30b of the support member 30. The steering axis line X passes through the center of the front wheel 3 in the vehicle width direction (center of the front wheel 3 in the axle line Q direction) and lies within a virtual plane perpendicular to the axle line Q.

Figure 3:
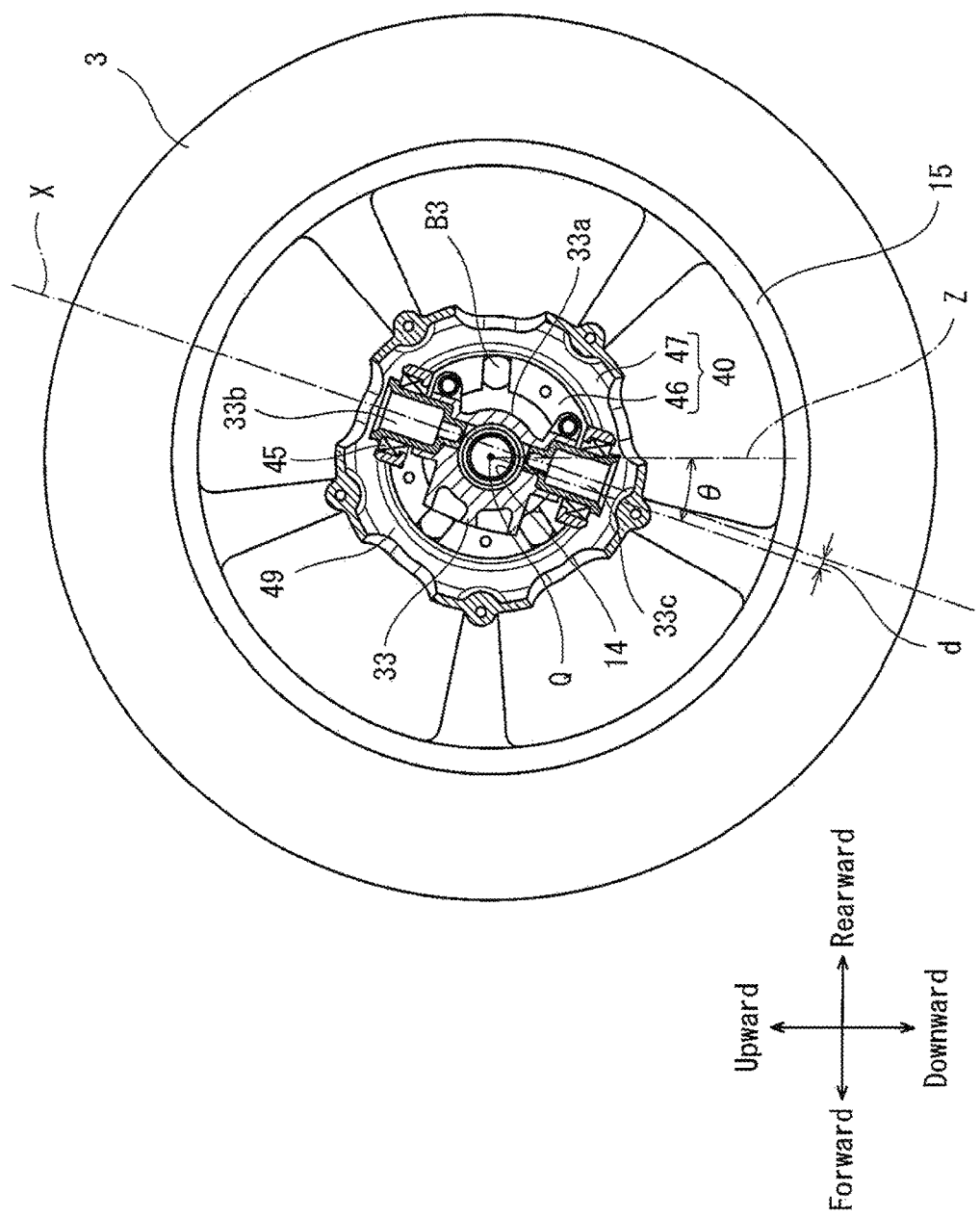
FIG. 3 is a cross-sectional view showing the front wheel support structure which is taken along a plane perpendicular to the axle line of FIG. 1.

FIG. 3 is a cross-sectional view showing the front wheel support structure 12 which is taken along a plane perpendicular to the axle line Q of FIG. 1. In the present embodiment, as shown in FIG. 3, the steering axis line X is deviated from the axle line Q, within a virtual plane including the steering axis line X and being perpendicular to the axle line Q. In the present embodiment, the steering axis line X is set to a location of the axle 14 that is rearward of the center axis of the axle 14. In the present embodiment, when viewed from the axle line Q direction, the steering axis line X is set to a location of the axle 14 that is rearward at a minimum distance d from the center axis of the axle 14, in the direction perpendicular to the steering axis line X direction.

As described above, the steering axis line X is deviated from the axle line Q and lies at a location that is rearward of and close to the axle line Q. The steering axis line X is placed on a plane perpendicular to the vehicle width direction, together with a stem axis line Y (described later).

As shown in FIG. 2, the protruding sections 30a, 30b of the support member 30 have through-holes, respectively, penetrating the protruding sections 30a, 30b in the steering axis line X direction. Each of the through-holes extends coaxially with the steering axis line X and has a stepped shape. Specifically, the through-hole formed in the upper protruding section 30a is formed as a stepped cylindrical space in which the diameter of an upper portion is larger than that of a lower portion. The through-hole formed in the lower protruding section 30b is formed as a stepped cylindrical space in which the diameter of a lower portion is larger than that of an upper portion. The through-holes are formed as depressed (recessed) regions for allowing the steering bearings 45 to be fitted into the protruding sections 30a, 30b, respectively. In other words, flanges 30c protruding radially inward are formed in portions of the inner peripheral surfaces of the protruding sections 30a, 30b, respectively, the portions being close to the axle 14.

The upper steering bearing 45 is inserted into the upper protruding section 30a from above the upper protruding section 30a. An outer race of the upper steering bearing 45 is positioned in such a manner that the lower end surface of the outer race contacts the upper surface of the flange 30c of the upper protruding section 30a. The outer peripheral surface of the outer race of the upper steering bearing 45 is pressingly secured to the inner peripheral surface of the upper protruding section 30a.

The lower steering bearing 45 is inserted into the lower protruding section 30b from below the lower protruding section 30b. An outer race of the lower steering bearing 45 is positioned in such a manner that the upper end surface of the outer race contacts the lower surface of the flange 30c of the lower protruding section 30b. The outer peripheral surface of the outer race of the lower steering bearing 45 is pressingly secured to the inner peripheral surface of the lower protruding section 30a. Since the through-holes of the protruding sections 30a, 30b are coaxial with the steering axis line X, the pair of steering bearings 45 are also coaxial with the steering axis line X.

The knuckle member 33 is secured to inner races of the pair of steering bearings 45. The inner races and outer races of the pair of steering bearings 45 are angularly displaceable around the steering axis line X. This allows the knuckle member 33 to be angularly displaceable around the steering axis line X relative to the support member 30.

The knuckle member 33 includes an axle support section 33a for supporting the axle 14. The axle support section 33a has an annular shape in which an insertion hole is formed in an inner peripheral portion thereof. The axle 14 is inserted into the insertion hole. The insertion hole is coaxial with the axle line Q. The insertion hole is formed as a depressed (recessed) region for allowing the pair of axle bearings 44 to be fitted into the axle support section 33a.

The inner peripheral surface of the axle support section 33a is formed with a pair of flanges 33v, protruding inward in the radial direction of the axle support section 33a, from the remaining portion of the axle support section 33a. The outer races of the pair of axle bearings 44 are positioned in such a manner that the inner end surfaces in the vehicle width direction of the outer races contact the pair of flanges 33v, respectively. The outer peripheral surfaces of the outer races of the pair of axle bearings 44 are pressingly secured to the inner peripheral surface of the axle support section 33a.

As described above, in the present embodiment, the pair of axle bearings 44 are fitted into the insertion hole of the axle support section 33a. The pair of axle bearings 44 are disposed in such a manner that the steering axis line X is interposed between the pair of axle bearings 44 and the pair of axle bearings 44 are spaced apart from each other in the axle line Q direction. The pair of flanges 33v of the axle support section 33a are closer to the steering axis line X than the pair of axle bearings 44, respectively. In this structure, the pair of axle bearings 44 are inserted into the insertion hole of the axle support section 33a, from both sides in the axle line Q direction. Since the insertion hole of the axle support section 33a is coaxial with the axle line Q, the pair of axle bearings 44 are also disposed coaxially with the axle line Q.

The axle 14 is secured to the inner races of the pair of axle bearings 44. Since the inner races and outer races of the pair of axle bearings 44 are relatively displaceable around the axle line Q, the axle 14 is rotatable around the axle line Q relative to the knuckle member 33.

Specifically, the axle 14 is a hollow shaft member. The axle 14 includes a body 14c, an increased-diameter portion 14a, and a reduced-diameter portion 14b. The body 14c extends in the axle line Q direction. The both end portions of the body 14c in a lengthwise direction are secured to the inner races of the pair of axle bearings 44, respectively.

The increased-diameter portion 14a is provided in the axle 14, on the first side (one side) in the axle line Q direction. The increased-diameter portion 14a has an outer diameter larger than that of the body 14c. A stepped portion is formed between the body 14c and the increased-diameter portion 14a. The end surface of the increased-diameter portion 14a, the end surface being closer to the steering axis line X, is in contact with the end surface of the inner race of the axle bearing 44 on the first side in the axle line Q direction, the end surface being on the first side in the axle line Q direction. In this way, the increased-diameter portion 14a is positioned.

The reduced-diameter portion 14b is provided in the axle 14, on a second side (the other side) in the axle line Q direction. The reduced-diameter portion 14b has an outer diameter smaller than that of the body 14c. The reduced-diameter portion 14b is inserted into a through-hole formed in an inner member 46 (described later). Between the body 14c and the reduced-diameter portion 14b, there is formed an inclined portion with a slope extending in a downward direction from the first side toward the second side in the axle line Q direction. This inclined portion is configured to contact the inner peripheral surface of the through-hole of the inner member 46. In this way, the reduced-diameter portion 14b is positioned.

A ring member 48 is disposed on the outer peripheral surface of the reduced-diameter portion 14b. Specifically, the inner peripheral surface of the ring member 48 is formed with a male thread, while the outer peripheral surface of the reduced-diameter portion 14b is formed with a female thread. The female thread of the reduced-diameter portion 14b is threadingly engaged with the male thread of the ring member 48. In this way, the ring member 48 is disposed on the outer peripheral surface of the reduced-diameter portion 14b.

As the female thread of the reduced-diameter portion 14b is threadingly engaged with the male thread of the ring member 48, the periphery of the through-hole of the inner member 46 is pressed against the inclined portion of the reduced-diameter portion 14b. In this way, the inner races of the pair of axle bearings 44 are positioned by use of the pair of flanges 33v as spacers. It should be noted that the axle 14 is preferably formed with a key groove for preventing the rotation of the inner member 46 around the axle line Q relative to the axle 14.

The knuckle member 33 includes two supported sections 33b, 33c provided on both sides in the upward and downward direction of at least a portion of the axle support section 33a in such a manner that the supported sections 33b, 33c are spaced apart from each other and face each other in the upward and downward direction. The two supported sections 33b, 33c are formed as cylindrical shaft members, respectively. The two supported sections 33b, 33c are formed separately from the axle support section 33a and coupled to the axle support section 33a. The two supported sections 33b, 33c are supported by the support member 30 in such a manner that the supported sections 33b, 33c are angularly displaceable around the steering axis line X relative to the support member 30.

Specifically, the upper and lower supported sections 33b, 33c are secured to the inner races of the pair of steering bearings 45, respectively. The upper supported section 33*b* extends upward from the axle support section 33*a* along the steering axis line X. The lower supported section 33*c* extends downward from the axle support section 33*a* along the steering axis line X. The two supported sections 33*b*, 33*c* extend coaxially with the steering axis line X.

The two supported sections 33*b*, 33*c* are supported by the support member 30 by use of the pair of steering bearings 45, respectively in such a manner that the supported sections 33*b*, 33*c* are angularly displaceable around the steering axis line X, relative to the support member 30. The two supported sections 33*b*, 33*c* of the knuckle member 33 are sections supported by the support member 30 by use of the pair of steering bearings 45.

As shown in FIG. 3, the two supported portions 33*b*, 33*c* are disposed with the axle 14 interposed between them in such a manner that the supported portions 33*b*, 33*c* are spaced apart from each other and face each other in the steering axis line X direction. When viewed from the steering axis line X direction, the axle support section 33*a* and the supported sections 33*b*, 33*c* are located inward of the front wheel 3 in the vehicle width direction.

At least one of the two supported sections 33*b*, 33*c* has a region overlapping with a portion of the axle 14, when viewed from the upward and downward direction. Also, at least one of the two supported sections 33*b*, 33*c* has a region overlapping with a portion of the axle support section 33*a*, when viewed from the upward and downward direction.

At least one of the two supported sections 33*b*, 33*c* has a region overlapping with a portion of the axle 14, when viewed from the steering axis line X direction. Also, at least one of the two supported sections 33*b*, 33*c* has a region overlapping with a portion of the axle support section 33*a*, when viewed from the steering axis line X direction.

In the present embodiment, the supported sections 33*b*, 33*c* are located closer to the axle line Q than a portion of the axle support section 33*a*, the portion being most distant in a rearward direction from the axle line Q, in the direction perpendicular to the axle line Q of FIG. 3.

In the present embodiment, when viewed from the axle line Q direction, a virtual line passing through the axle line Q and extending in parallel with the steering axis line X, passes through a portion of the supported sections 33*b*, 33*c*. In the present embodiment, when viewed from the axle line Q direction, the supported sections 33*b*, 33*c* are located forward of a virtual line passing through the rear end of the axle support section 33*a* and extending in parallel with the steering axis line X. Also, when viewed from the axle line Q direction, the supported sections 33*b*, 33*c* are located rearward of a virtual line passing through the front end of the axle support section 33*a* and extending in parallel with the steering axis line X.

In the present embodiment, the lower supported section 33*c* has a region located forward of a virtual line passing through the axle 14 and extending in the vertical direction. When viewed from the axle line Q direction, the upper supported section 33*b* is located rearward of the virtual line passing through the axle 14 and extending in the vertical direction.

At least one of (both in the present embodiment) the two supported sections 33*b*, 33*c* is removably (detachably) mounted on the axle support section 33*a*. As shown FIG. 2, each of the supported sections 33*b*, 33*c* has a bottomed cylinder shape with a bottom located closer to the axle 14.

Each of the supported sections 33*b*, 33*c* includes a body 33*o*, a male thread 33*x*, and a flange 33*y*. The body 33*o* has a cylindrical shape having an inner space which opens on a first side in its axial direction. The body 33*o* extends in the steering axis line X direction.

The male threads 33*x* of the supported sections 33*b*, 33*c* have the same shape. The flanges 33*y* of the supported sections 33*b*, 33*c* have the same shape. The male thread 33*x* is connected to a first end portion of the body 33*o* in the axial direction. The flange 33*y* is connected to a second end portion of the body 33*o* in the axial direction. The male thread 33*x* is provided at a first end portion of each of the supported sections 33*b*, 33*c*, the first end portion being closer to the axle 14, in a state in which each of the supported sections 33*b*, 33*c* is mounted on the axle support section 33*a*. The male thread 33*x* is coaxial with the body 33*o*. The male thread 33*x* has a diameter smaller than that of the body 33*o*. The male thread 33*x* protrudes from the body 33*o* toward the axle 14.

The flange 33*y* is provided at a second end portion of each of the supported sections 33*b*, 33*c*, the second end portion being located on a side opposite to a side where the male thread 33*x* is located, in a state in which each of the supported sections 33*b*, 33*c* is mounted on the axle support section 33*a*. The flange 33*y* is formed by partially increasing the outer diameter of the body 33*o*. The end surface of the flange 33*y* of the upper supported section 33*b*, the end surface being closer to the axle 14, is configured to contact the upper end surface of the inner race of the upper steering bearing 45. The end surface of the flange 33*y* of the lower supported section 33*c*, the end surface being closer to the axle 14, is configured to contact the lower end surface of the inner race of the lower steering bearing 45.

The knuckle member 33 is formed with insertion section(s) 33*d* into which at least one (both in the present embodiment) of the two supported sections 33*b*, 33*c* is insertable. Specifically, each of the insertion sections 33*d* is integrated with the axle support section 33*a*. Each of the insertion sections 33*d* has a tubular shape in which it protrudes from the axle support section 33*a* in the steering axis line X direction.

Each of the insertion sections 33*d* is formed with an opening into which the end portion of the corresponding one of the supported sections 33*b*, 33*c*, the end portion being closer to the axle 14, is insertable. The opening formed in each of the insertion sections 33*d* has a diameter for allowing the body 33*o* of the corresponding one of the supported sections 33*b*, 33*c* to be inserted thereinto. The opening is coaxial with the steering axis line X.

The bottom of the opening of each of the insertion sections 33*d* is formed with a female thread 33*w* which is threadingly engageable with the male thread 33*x* of the corresponding one of the supported sections 33*b*, 33*c*. A thread hole formed in the female thread 33*w* extends to an insertion hole formed in the axle support section 33*a*. The thread hole of the female thread 33*w* is coaxial with the steering axis line X. A dimension in a height direction, of the tubular portion of the insertion section 33*d*, is greater than the axial length of the male thread 33*x*.

The body 33*o* has an axial dimension larger than that of the steering bearing 45. The protruding sections 30*a*, 30*b* have a dimension in the steering axis line X direction which is larger than that of the upper and lower insertion sections 33*d*.

A distance in the steering axis line X direction between the protruding sections 30*a*, 30*b* of the support member 30 is set larger than a distance in the steering axis line X direction from the upper end surface of the upper insertion section 33*d* to the lower end surface of the lower insertion section 33*d*. In this structure, there are gaps in the steering axis line X direction, between the upper end surface of the upper insertion section 33d and the protruding section 30a, and between the lower end surface of the lower insertion section 33d and the protruding section 30b. Therefore, in a state in which the supported sections 33b, 33c are detached (dismounted) from the axle support section 33a, the axle support section 33a can be placed between the protruding sections 30a, 30b of the support member 30, without interference with the protruding sections 30a, 30b.

The body 33o of each of the supported sections 33b, 33c has an axial dimension larger than a dimension which is a sum of the dimension in the height direction of the tubular portion of the insertion section 33d and the axial dimension of the inner race of the steering bearing 45. This allows the body 33o to be retained in the inner race of the steering bearing 45 in a state in which the body 33o is inserted into the insertion section 33d.

Next, a procedure for coupling the knuckle member 33 to the support member 30 will be described. As shown in FIG. 2, the pair of steering bearings 45 are inserted into the protruding sections 30a, 30b of the support member 30, respectively. Then, the insertion sections 33d of the knuckle member 33 are disposed coaxially with the steering axis line X set in the protruding sections 30a, 30b.

Then, the upper supported section 33b is inserted along the steering axis line X direction, from a position above the support member 30. The male thread 33x which is the tip end portion in an inserting direction, of the upper supported section 33b, passes through the through-hole of the upper protruding section 30a, and the upper supported section 33b is guided to the tubular portion of the insertion section 33d. This makes it possible to prevent a position deviation (position gap) in the direction perpendicular to the steering axis line X direction, between the support member 30 and the knuckle member 33.

The upper supported section 33b is further inserted in the downward direction, and the male thread 33x contacts the female thread 33w of the insertion section 33d. In this state, the upper supported section 33b is rotated around the steering axis line X. Thus, the male thread 33x is threadingly engaged with the female thread 33w, and threading progresses. The end surface of the body 33o of the upper supported section 33b, the end surface being radially adjacent to the male thread 33x, contacts the bottom surface of the insertion section 33d. Thereby, the upper supported section 33b is positioned in the steering axis line X direction. In this way, the upper supported section 33b is mounted on the axle support section 33a.

Then, the lower supported section 33c is inserted along the steering axis line X direction, from a position below the support member 30. The male thread 33x which is the tip end portion in the inserting direction, of the lower supported section 33c, passes through the through-hole of the lower protruding section 30b, and the lower supported section 33c is guided to the tubular portion of the insertion section 33d. The lower supported section 33c is further inserted in the upward direction and rotated around the steering axis line X. Thus, the male thread 33x is threadingly engaged with the female thread 33w, and threading progresses. In a state in which the end surface of the body 33o of the lower supported section 33c, the end surface being radially adjacent to the male thread 33x, is apart from the bottom surface of the insertion section 33d, the lower supported section 33c is positioned in the steering axis line X direction. In this way, the lower supported section 33c is mounted on the axle support section 33a.

In the above-described manner, the axle support section 33a and the support member 30 are coupled to each other via the supported sections 33b, 33c. This allows the knuckle member 33 to be supported by the support member 30 in such a manner that the knuckle member 33 is angularly displaceable around the steering axis line X relative to the support member 30. The flange 33y of the upper supported section 33b contacts the upper end surface of the inner race of the upper steering bearing 45, and the flange 33y of the lower supported section 33b contacts the lower end surface of the inner race of the lower steering bearing 45. This makes it possible to prevent a position deviation (position gap) in the steering axis line X direction, between the axle support section 33a and the support member 30.

The end surface of the body 33o of the upper supported section 33b, the end surface being radially adjacent to the male thread 33x contacts the bottom surface of the insertion section 33d. In this structure, in a case where an upward external force from a ground surface acts on the front wheel 3, it becomes possible to suppress concentration of a stress while this external force is transmitted from the axle support section 33a to the upper supported section 33b. As a result, the front wheel 3 can be easily supported.

As described above, in the motorcycle 1, the two supported sections 33b, 33c are disposed on both sides in the upward and downward direction of at least a portion of the axle support section 33a in such a manner that the supported sections 33b, 33c are spaced apart from each other and face each other in the upward and downward direction. Therefore, the two supported sections 33b, 33c are disposed to face a portion of the axle 14 of the front wheel 3, namely, to overlap with a portion of the axle 14 in the forward and rearward direction, when viewed from the upward and downward direction. Since the two supported sections 33b, 33c are disposed to face a portion of the axle 14 of the front wheel 3 in this way, it becomes possible to reduce the protruding amount of the two supported sections 33b, 33c which protrude from the axle 14 in the forward and rearward direction.

Since the two supported sections 33b, 33c are disposed in such a manner that they are spaced apart from each other and face each other in the upward and downward direction, a distance in the upward and downward direction between the two supported sections 33b, 33c can be set larger than the dimension in the upward and downward direction of the axle support section 33a. As a result, the knuckle member 33 can be more stably supported by the support member 30.

Therefore, the size of the knuckle member 33 in the radial direction of the front wheel 3 does not increase. The knuckle member 33 can be made compact. In addition, stiffness of the two supported sections 33b, 33c supported by the support member 30 can be increased.

The two supported sections 33b, 33c are spaced apart from each other in the upward and downward direction and individually configured. In this configuration, the axle 14 can be placed between the upper and lower supported sections 33b, 33c, and the two supported sections 33b, 33c are allowed to approach the axle 14 in the forward and rearward direction. The upper supported section 33b extends upward from the axle support section 33a, and the lower supported section 33c extends downward from the axle support section 33a. This makes it possible to prevent the contour of the knuckle member 33 from being radially away from the axle 14, and to reduce the size of the knuckle member 33, compared to a case where the upper supported section 33b and the lower supported section 33c extend in the upward and downward direction from locations that are away in the forward and rearward direction from the axle support section 33a.

Since the two supported sections 33b, 33c are supported by the support member 30 by use of the steering bearings 45 disposed coaxially with the steering axis line X in such a manner that the supported sections 33b, 33c are angularly displaceable around the steering axis line X, the knuckle member 33 can be sufficiently supported by the support member 30 in such a manner that the knuckle member 33 is angularly displaceable around the steering axis line X.

Since the two supported sections 33b, 33c are removably (detachably) mounted on the axle support section 33a, the knuckle member 33 can be made compact, and easily formed, compared to a case where both of the two supported sections 33b, 33c are integrated with the axle support section 33a.

In a state in which the two supported sections 33b, 33c are removed (detached) from the axle support section 33a, the axle support section 33a can be disposed between the upper and lower protruding sections 30a, 30b, and the axle support section 33a can be aligned with the protruding sections 30a, 30b along the steering axis line X. In this state, the two supported sections 33b, 33c are mounted on the axle support section 33a and are retained by the support member 30.

After the alignment between the axle support section 33a and the support member 30, the two supported sections 33b, 33c can be mounted on the axle support section 33a. This allows the operator to easily perform a mounting work while preventing interference with the supported sections 33b, 33c, compared to a case where the supported sections 33b, 33c are integrated with the axle support section 33a.

Since the knuckle member 33 includes the insertion section(s) 33d, and at least one of the two supported sections 33b, 33c is inserted into the insertion section 33d in the steering axis line X direction, the supported section(s) 33b, 33c can be mounted on the axle support section 33a, in a state in which the supported section(s) 33b, 33c inserted into the insertion section(s) 33d is/are positioned. This allows the operator to easily perform an assembling work for the knuckle member 33.

Figure 4:
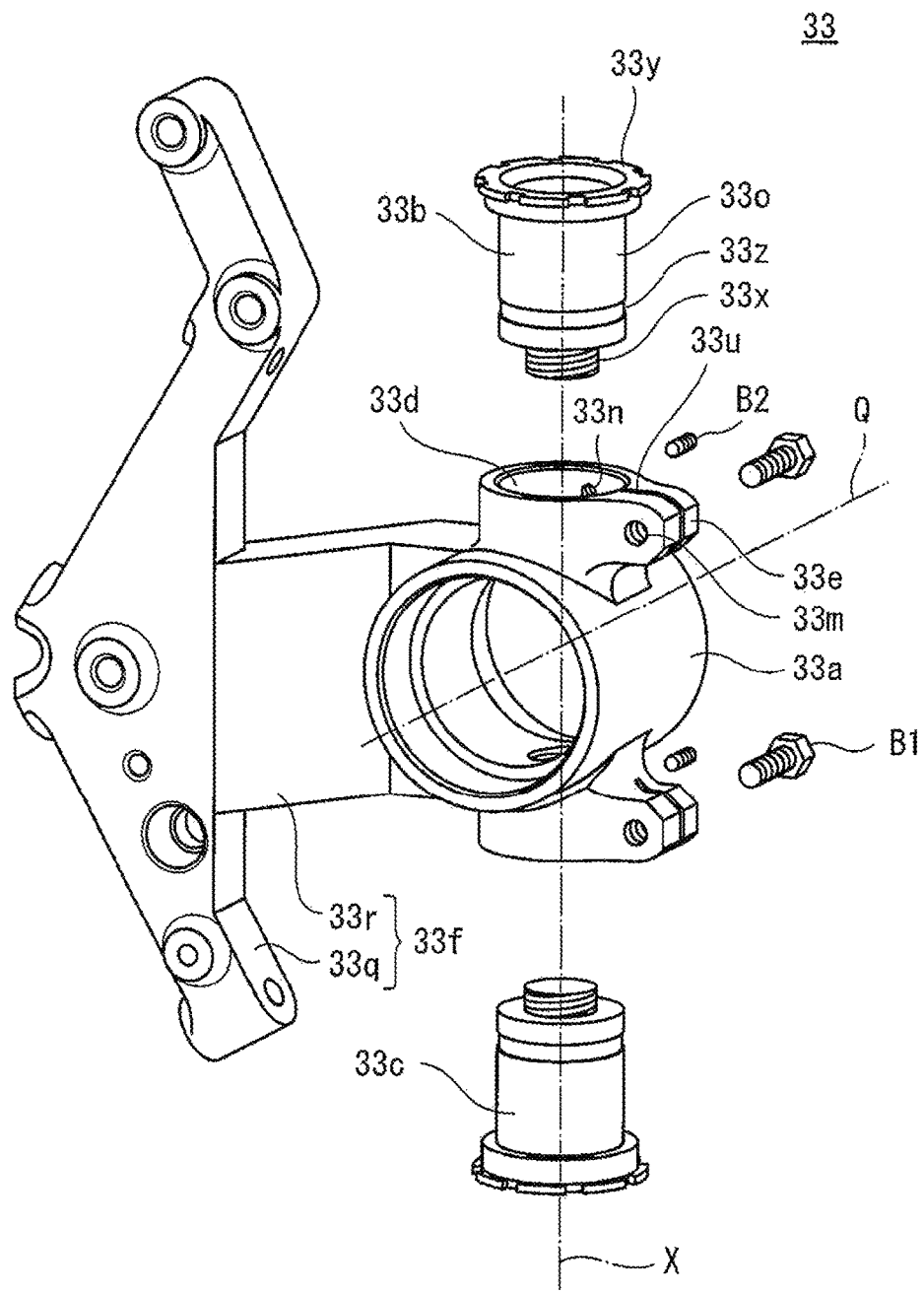
FIG. 4 is an exploded perspective view showing a knuckle member of FIG. 1, when viewed from the left and the rear.
Figure 4:
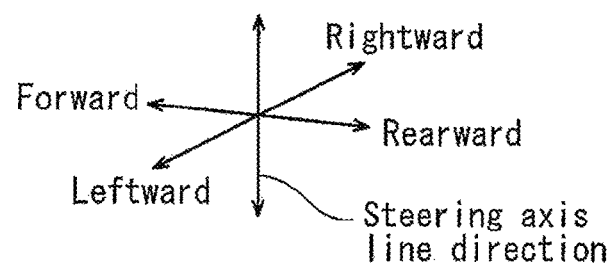

FIG. 4 is an exploded perspective view showing the knuckle member 33 of FIG. 1, when viewed from the left and the rear. As shown in FIG. 4, each of the two supported sections 33b, 33c is formed with a groove 33z. The groove 33z is formed in the body 33o. The groove 33z is formed as a depressed (recessed) region which is depressed radially inward from the remaining portion of the body 33o. The groove 33z is formed over the entire circumference of the body 33o around the steering axis line X. The groove 33z is formed in a region of the body 33o which faces the insertion section 33d, in a state in which each of the two supported sections 33b, 33c is inserted into the corresponding insertion section 33d.

The flange 33y has a non-circular periphery when viewed from the steering axis line X direction. Specifically, a plurality of regions which are depressed inward in the radial direction of the supported sections 33b, 33c are formed in the outer periphery of the flange 33g in such a manner that these depressed regions are apart from each other in the flange 33y in a circumferential direction. In this structure, a flange operation jig (tool) is engaged with these depressed region of the flange 33y, and the male thread 33x can be threadingly engaged with the female thread 33w.

In the present embodiment, the insertion section 33d is formed with a slit 33u at a circumferential position (rear portion in the present embodiment) of the tubular portion.

The slit 33u radially penetrates the insertion section 33d and extends in the vehicle width direction. The slit 33u extends to an end portion of the insertion section 33d which is closer to the opening and is opened in the steering axis line X direction. Because of the slit 33u, the cross-section of the insertion section 33d which is perpendicular to the steering axis line X direction has a substantially-C shape, and an inner space and an outer space of the insertion section 33d are in communication with each other in the radial direction. In other words, the insertion section 33d has a first end portion in the circumferential direction and a second end portion in the circumferential direction which are adjacent to the slit 33u.

The knuckle member 33 is attached with a displacement inhibiting element for inhibiting a displacement with respect to the axle support section 33a, of at least one (both in the present embodiment) of the two supported sections 33b, 33c mounted on the axle support section 33a. Specifically, the knuckle member 33 includes displacement inhibiting sections 33e. The displacement inhibiting sections 33e correspond to the two supported sections 33b, 33c, respectively. In other words, the displacement inhibiting sections 33e are formed in the pair of insertion sections 33d, respectively.

The pair of displacement inhibiting sections 33e are located rearward of the axle support section 33a. The pair of displacement inhibiting sections 33e are spaced apart from each other in the upward and downward direction. The pair of displacement inhibiting sections 33e are integrated with the axle support section 33a.

Each of the pair of displacement inhibiting sections 33e includes a first portion which is connected to a first end portion of the insertion section 33d in the circumferential direction and extends rearward from the first end portion, and a second portion which is connected to a second end portion of the insertion section 33d in the circumferential direction and extends rearward from the second end portion. The first portion and the second portion face each other with a gap in the circumferential direction in such a manner that the first and second portions are spaced apart from each other in the circumferential direction of the insertion section 33d. By a first displacement inhibiting element attached on each of the pair of displacement inhibiting sections 33e, the first portion and the second portion are deformed in the circumferential direction to approach each other. According to the deformation of the first portion and the second portion, the insertion section 33d connected to the first and second portions is deformed so that its diameter is reduced.

In the present embodiment, the pair of first and second portions are formed with female threads 33m, respectively, penetrating the first and second portions along the circumferential direction. The first displacement inhibiting element is threadingly engaged with the female threads 33m of the pair of first and second portions, from the second side in the vehicle width direction, namely, a side opposite to a side where the support member 30 is located. In the present embodiment, the first displacement inhibiting element is a bolt B1.

Each of the insertion sections 33d is formed with a through-hole penetrating the peripheral wall of the tubular portion, at a location on the second side in the vehicle width direction. A second displacement inhibiting element is attached on each of the insertion sections 33d. The second displacement inhibiting element is inserted into the through-hole and protrudes into the inner space of the insertion section 33d. Specifically, each of the insertion sections 33d is formed with a female thread 33n penetrating the peripheral wall of the tubular portion, at a location that is on the second side in the vehicle width direction. A screw B2 as the second displacement inhibiting element is threadingly engaged with the female thread 33n, from the second side of the knuckle member 33 in the vehicle width direction. The screw B2 is protrusive into the inner space of the insertion section 33d.

As should be appreciated from the above, the first and second displacement inhibiting elements are disposed at locations of the knuckle member 33 on a side (on the second side in the vehicle width direction) opposite to a side where the support member 30 is located, with the steering axis line X interposed, in a state in which the knuckle member 33 is mounted on the support member 30.

As the bolts B1 are threadingly engaged with the female threads 33m of the displacement inhibiting sections 33e, and the threading progresses, in a state in which the supported sections 33b, 33c are inserted into the insertion sections 33d, respectively, and the male threads 33x are threadingly engaged with the female threads 33w, respectively, the pair of first and second portions of each of the insertion sections 33d move and approach each other, so that the diameter of the opening of each of the insertion sections 33d is reduced. This allows the two supported sections 33b, 33c to sealingly contact the peripheries of the openings of the insertion sections 33d, respectively, and secured to the insertion sections 33d, respectively.

As the screws B2 are threadingly engaged with the female threads 33n of the insertion sections 33d, the tip end portions of the screws B2 are disposed inside the grooves 33z, respectively. The screws B2 can inhibit a displacement of the two supported sections 33b, 33c in the steering axis line X direction.

In the above-described manner, in a state in which the axle support section 33a is coupled to the support member 30 by the two supported sections 33b, 33c, the first and second displacement inhibiting elements inhibit a displacement between the two supported sections 33b, 33c and the axle support section 33a. This makes it possible to prevent the two supported sections 33b, 33c from being disengaged from the insertion sections 33d. In this way, the knuckle member 33 can be firmly fastened to the support member 30.

Since the first and second displacement inhibiting elements are threadingly engaged to inhibit the displacement between the supported sections 33b, 33c and the axle support section 33a (a displacement inhibiting work is performed), from a side opposite to the side where the support member 30 is located, it becomes possible to prevent a situation in which the displacement inhibiting elements and the tool used for threading the displacement inhibiting elements interfere with the support member 30. Therefore, the operator can easily perform the displacement inhibiting work.

The displacement inhibiting sections 33e are disposed at the center of the knuckle member 33 in the vehicle width direction. In other words, the displacement inhibiting sections 33e are disposed inward in the axle line Q direction, relative to the end surface of the axle support section 33a in the axle line Q direction. In this layout, it become possible to prevent the both end portions of the bolt B1 as the first displacement inhibiting element from protruding from the axle support section 33a in the axle line Q direction. Therefore, it become possible to prevent interference between the bolt B1 and adjacent members such as the support member 30.

The screw B2 as the second displacement inhibiting element is preferably buried into the insertion section 33d in a state in which its threaded portion has a largest outer diameter in the radial direction. This makes it possible to prevent the screw B2 from protruding in the axle line Q direction from the axle support section 33a. Therefore, it become possible to prevent interference between the screw B2 and the adjacent member such as the support member 30.

Each of the displacement inhibiting sections 33e extends rearward from the corresponding insertion section 33d. With this structure, the displacement inhibiting section 33e can be formed independently of a portion extending forward from the axle support section 33a. Thus, design flexibility can be improved.

In a case where the knuckle member 33 is mounted on the support member 30, the bolt B1 is threadingly engaged with the female thread 33m and the screw B2 is threadingly engaged with the female thread 33n, from the second side in the vehicle width direction. This allows the operator to easily perform the displacement inhibiting work for at least one of the two supported sections 33b, 33c with respect to the axle support section 33a. Therefore, the operator can easily perform an assembling work for the knuckle member 33 while realizing the knuckle member 33 with a compact configuration.

The knuckle member 33 includes an angular displacement member coupling section 33f. An angular displacement member which is angularly displaceable around the steering axis line X together with the knuckle member 33 is coupled to the angular displacement member coupling section 33f. The angular displacement member includes a speed sensor and the steering mechanism 11 of the motorcycle 1, and is not limited to these.

The angular displacement member coupling section 33f is disposed in front of the axle support section 33a. The angular displacement member coupling section 33f extends to the first side in the vehicle width direction from the axle support section 33a. The angular displacement member coupling section 33f includes a forward extension portion 33r connected to the axle support section 33a and extending forward from the axle support section 33a, and an upward/downward extension portion 33q connected to the forward extension portion 33r and extending upward and downward from the forward extension portion 33r.

The forward extension portion 33r extends forward from the axle support section 33a and to the first side in the vehicle width direction. The front end portion of the forward extension portion 33r is located forward of the front end portion of the support member 30 with a space between them. The front end portion of the forward extension portion 33r is disposed on the first side in the vehicle width direction relative to the steering axis line X. In the present embodiment, the front end portion of the forward extension portion 33r is located on the first side in the vehicle width direction relative to the two supported sections 33b, 33c. The front end portion of the forward extension portion 33r is located on the first side in the vehicle width direction, relative to a rotary component (described later). Most part of the forward extension portion 33r is located in a space that is radially inward of an outer member 47 of the rotary component coupling member 40.

The upward/downward extension portion 33q is disposed on the first side in the vehicle width direction, relative to the rotary component, and extends in the upward and downward direction from the forward extension portion 33r. In the present embodiment, the upward/downward extension portion 33q extends upward and downward from the forward extension portion 33r.

In the present embodiment, an upper portion of the upward/downward extension portion 33q, extending upward from the forward extension portion 33r, extends forward in the direction perpendicular to the steering axis line X. In other words, the upper portion of the upward/downward extension portion 33q is inclined in the upward direction as it extends in the forward direction. With this shape, the upward/downward extension portion 33q can be placed in a relatively wide space formed in front of the steering axis line X, the stiffness of the knuckle member 33 can be increased, and interference between the knuckle member 33 and the adjacent member can be prevented.

The steering mechanism 11 is coupled to the upper portion of the upward/downward extension portion 33q. In the present embodiment, the upper portion of the upward/downward extension portion 33q has a side surface extending in the upward and downward direction, on the first side in the vehicle width direction, relative to the steering axis line X. A plurality of bolt holes are formed in the side surface of the upper portion of the upward/downward extension portion 33q to fasten a first arm member 20 (see FIG. 8) of the steering mechanism 11 to the knuckle member 33. The first arm member 20 is coupled to the upward/downward extension portion 33q by use of fastening members inserted through the plurality of bolt holes, respectively.

A speed sensor, brake calipers 8 (see FIG. 1), a speed sensor wire, a brake hose, and the like are fastened to the upward/downward extension portion 33q. The lower portion of the upward/downward extension portion 33q, extending downward from the forward extension portion 33r, has a side surface extending in the upward/downward direction, on the first side in the vehicle width direction, relative to the steering axis line X. A sensor insertion hole and a bolt hole used to fasten the speed sensor to the knuckle member 33 are formed in the side surface of the lower portion of the upward/downward extension portion 33q. The speed sensor is coupled to the upward/downward extension portion 33q by use of the fastening member inserted into the bolt hole, in a state in which the speed sensor is inserted into the sensor insertion hole.

The brake caliper 8 is configured to brake the rotation of the front wheel 3. In the present embodiment, two brake calipers 8 are fastened to the upward/downward extension portion 33q. Specifically, the two brake calipers 8 are disposed in front of the axle support section 33a of the knuckle member 33. The two brake calipers (first and second brake calipers) 8 are arranged on an upper side and a lower side, respectively.

The first brake caliper 8 is provided at the upper portion of the upward/downward extension portion 33q. The second brake caliper 8 is provided at the lower portion of the upward/downward extension portion 33q. The upper portion of the upward/downward extension portion 33q has two functions, which are a function of supporting the first brake caliper 8 and a function of being coupled to the steering mechanism 11. The upper portion of the upward/downward extension portion 33q and the first brake caliper 8 extend in the same direction. This makes it possible to prevent an increase in the size of the knuckle member 33.

An air guide member 9 is also fastened to the upward/downward extension portion 33q to guide air to a brake disc 7 (described later). The air guide member 9 serves to guide the air to a location of the brake disc 7 which is on a downstream side of the brake caliper 8 in a rotation direction. In the present embodiment, since the two brake calipers 8 are provided, the air guide member 9 is disposed to guide the air to a location of the brake disc 7 which is on a downstream side of each of the brake calipers 8 in the rotation direction.

[Structure of Other Constituents of Motorcycle]

Figure 5:
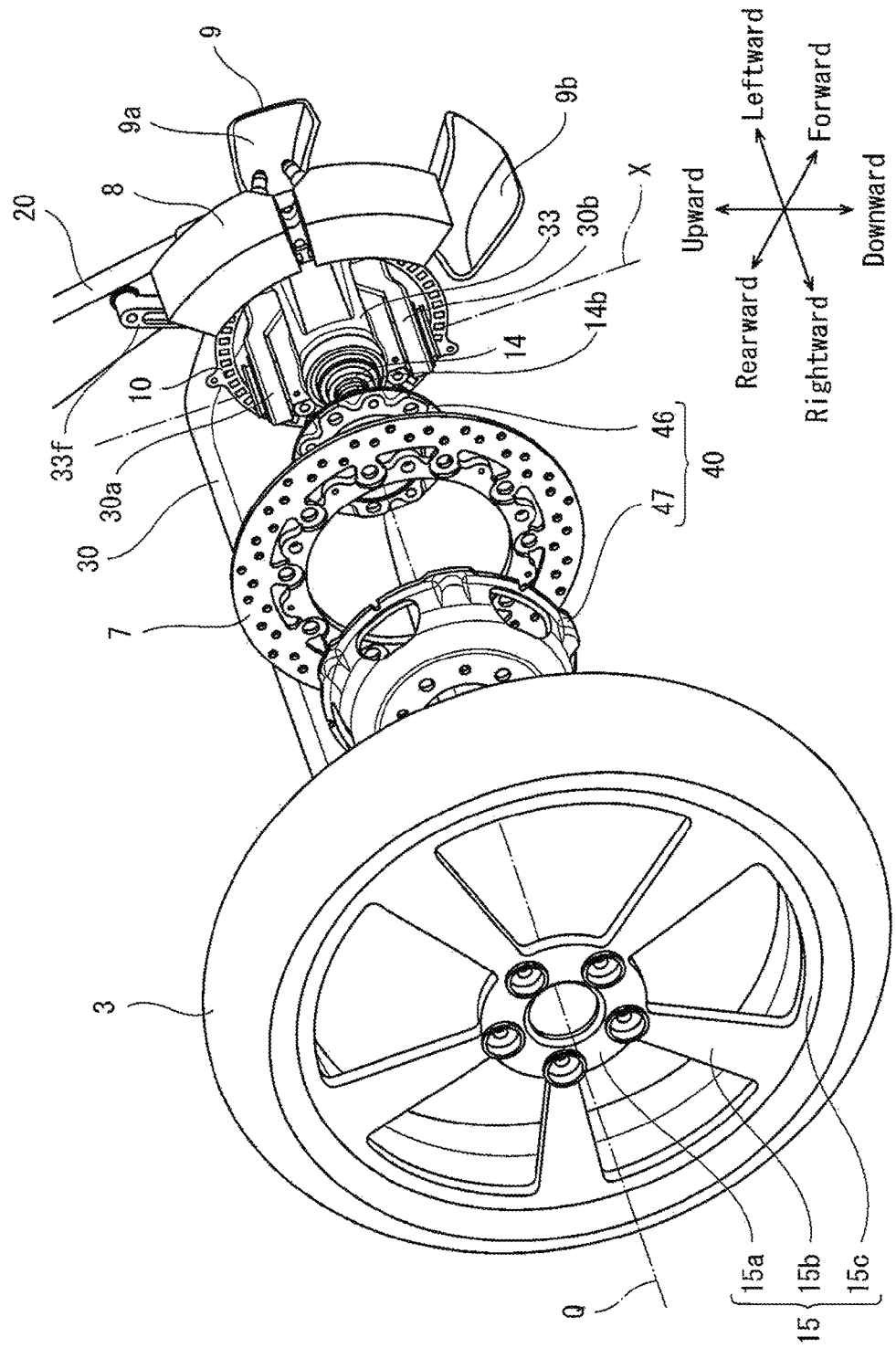
FIG. 5 is an exploded perspective view showing members which are arranged in the vicinity of an axle of FIG. 1.

FIG. 5 is an exploded perspective view showing members which are arranged in the vicinity of the axle 14 of FIG. 1. As shown in FIG. 5, the motorcycle 1 includes the rotary component coupling member 40 used to couple the front wheel 3 to the axle 14. The rotary component coupling member 40 couples to the axle 14 the rotary component rotatable around the axle line Q together with the axle 14.

The rotary component coupling member 40 includes an inner member 46 and the outer member 47. The inner member 46 has a disc shape. Specifically, the inner member 46 has a flange shape in which a through-hole is formed in a radially inward region. The inner diameter of the through-hole is set to a value larger than the outer diameter of the reduced-diameter portion 14b of the axle 14. The reduced-diameter portion 14b of the axle 14 is inserted into the through-hole.

A first guide section 46a (see FIG. 2) is formed in the periphery of the through-hole of the inner member 46, on the second side in the axle line Q direction. The first guide section 46a extends in a tubular shape in the axle line Q direction and is configured to guide the front wheel 3. The first guide section 46a is inserted into the through-hole of the outer member 47 and a wheel 15 attached on the front wheel 3.

A plurality of first and second insertion holes are formed in a region of the inner member 46 that is radially outward of the first guide section 46a, on the second side in the axle line Q direction. The plurality of first and second insertion holes are spaced apart from each other in the circumferential direction of the through-hole of the inner member 46. Concave/convex portions extending in the circumferential direction are provided on the surface of the periphery of the through-hole of the inner member 46, on the second side in the axle line Q direction. The concave/convex portions serve to prevent rotation of the outer member 47 around the axle line Q relative to the inner member 46. The end surface of the ring member 48, on the first side in the axle line Q direction, is configured to contact the surface of the inner member 46 on the second side in the axle like Q direction.

The inner member 46 includes in the periphery of the through-hole on the first side in the axle line Q direction, a second guide section 46b (see FIG. 2) which extends in a tubular shape in the axle line Q direction, and guides the reduced-diameter portion 14b of the axle 14 and a portion of the body 14c of the axle 14. The second guide section 46b is inserted into the reduced-diameter portion 14b of the axle 14 and a portion of the body 14c of the axle 14.

The outer member 47 has a substantially bottomed tube shape which opens the inner space in one direction. More specifically, the outer member 47 has a bowl shape having an opening which opens the inner space from the first side to the second side in the axle line Q direction.

A through-hole is formed in a radially inward region of the bottom portion of the outer member 47. A plurality of third and fourth insertion holes are formed in a radially outward region of the bottom portion of the outer member 47 in such a manner that the plurality of third and fourth insertion holes are spaced apart from each other in the circumferential direction of the through-hole. Concave/convex portions are provided in the periphery of the through-hole of the bottom portion of the outer member 47, on the first side in the axle line Q direction. The concave/convex portions of the outer member 47 are engageable with the concave/convex portions of the inner member 46 and are configured to be in surface contact with the radially outward region of the inner member 46 on the second side in the axle line Q direction.

In a state in which the concave/convex portions of the outer member 47 are engaged with the concave/convex portions of the inner member 46, the first insertion holes are aligned with the third insertion holes, respectively, and the second insertion holes are aligned with the fourth insertion holes, respectively. By use of fastening members inserted into the first and third insertion holes, the outer member 47 and the inner member 46 are removably (detachably) coupled to each other. In addition, by use of bolts B3 as the fastening members which are inserted into the second and fourth insertion holes, the outer member 47 and the inner member 46 are removably (detachably) coupled to the wheel 15. In the present embodiment, the bolts B3 are inserted into the second and fourth insertion holes from the second side in the vehicle width direction, relative to the inner member 46.

The outer diameter of the outer member 47 increases from the bottom portion toward the first side in the axle line Q direction. The side portion of the outer member 47 has a plurality of hollow portions arranged apart from each other around the axle line Q, to reduce the weight of the outer member 47. The outer member 47 is accommodated in the inner space of the wheel 15.

The periphery of the opening of the outer member 47 has a flange shape. The end surface of the periphery of the opening of the outer member 47 on the first side in the axle line Q direction is configured to be in surface contact with the radially inward region of the brake disc 7 on the second side in the axle line Q direction. A plurality of female threads are provided in the end surface of the periphery of the opening of the outer member 47 on the first side in the axle line Q direction in such a manner that the female threads are arranged apart from each other in the circumferential direction of the through-hole of the outer member 47.

The brake disc 7 is formed with a plurality of fifth insertion holes at locations corresponding to the plurality of female threads of the outer member 47, respectively. Fastening members are inserted into the plurality of fifth insertion holes and threadingly engaged with the plurality of female threads of the outer member 47. By fastening the fastening members inserted into the fifth insertion holes of the brake disc 7 to the female threads of the outer member 47, the outer member 47 and the brake disc 7 are removably (detachably) coupled to each other.

As described above, the inner member 46 is provided with the axle coupling section to be coupled to the axle 14. The outer member 47 is provided with the rotary component coupling section which is connected to the axle coupling section and to which the rotary component rotatable around the axle line Q together with the axle 14 is coupled, and the steered wheel coupling section to which the steered wheel is coupled. Alternatively, the outer member 47 and the inner member 46 may be integrated.

The front wheel 3 has a shape in which a surface facing the ground surface is curved, when viewed from the radial direction of the front wheel 3. Specifically, the outer diameter of the front wheel 3 increases from the end surface in the vehicle width direction toward the center in the vehicle width direction. The steering axis line X is set to pass through the center of the front wheel 3 in the vehicle width direction. This makes it possible to prevent a situation in which steering torque provided by the rider for steering in the rightward and leftward direction becomes non-uniform in the rightward and leftward direction.

The wheel 15 supports the front wheel 3 from a radially inward side thereof. The wheel 15 includes a mounting section 15a, a plurality of coupling sections 15b, and a rim section 15c. The mounting section 15a is disposed radially inward of the outer peripheral surface of the front wheel 3, and coupled to the rotary component coupling member 40. The mounting section 15a is disposed on the second side in the vehicle width direction relative to the steering axis line X. The mounting section 15a has a through-hole into which the ring member 48 is insertable from the second side toward the first side in the axle line Q direction. A plurality of sixth insertion holes are formed in the peripheral portion of the through-hole of the mounting section 15a and arranged in the circumferential direction of the through-hole.

The bolts B3 inserted into the second and fourth insertion holes are inserted into the sixth insertion holes of the mounting section 15a. In other words, the wheel 15 is coupled to the rotary component coupling member 40 in the periphery of the through-hole of the mounting section 15a. The wheel 15 is removably (detachably) coupled to the rotary component coupling member 40 from the second side in the vehicle width direction. This allows the front wheel 3 to be removably coupled to the steered wheel coupling section of the rotary component coupling member 40, from the second side in the vehicle width direction.

Specifically, the mounting section 15a is formed with a plurality of depressed (recessed) regions which are arranged in the circumferential direction of the through-hole, and depressed in the direction from the second side in the axle line Q direction toward the first side in the axle line Q direction. The sixth insertion holes are formed inside the depressed regions, respectively. In the present embodiment, nuts which are engageable with the bolts B3 are accommodated in the depressed regions, respectively, when the wheel 15 is coupled to the rotary component coupling member 40 by use of the bolts B3.

The plurality of coupling sections 15b are disposed apart from each other around the axle line Q and extend from the mounting section 15a in a radially outward direction of the front wheel 3. The plurality of coupling sections 15b couple the mounting section 15a to the rim section 15c. The plurality of coupling sections 15b are disposed outward in the vehicle width direction relative to the outer member 47. The mounting section 15a and the plurality of coupling section 15b are disposed in the wheel 15 on the second side in the vehicle width direction. In this structure, the wheel 15 has an inner space disposed on the second side in the vehicle width direction, relative to the mounting section 15a and the plurality of coupling sections 15b.

The rim section 15c is connected to the end portions of the plurality of coupling sections 15b, the end portions being on a side opposite to a side where the mounting section 15a is located, and mounted on the radially inward region of the front wheel 3. The rim section 15c includes a portion extending in the vehicle width direction in such a manner that the steering axis line X lies within this portion in the vehicle width direction. In the present embodiment, the center of the rim section 15c in the vehicle width direction is located on the steering axis line X.

The two supported sections 33b, 33c are disposed inward in the radial direction of the axle 14, relative to the rotary component coupling member 40 and the rotary component. This makes it possible to prevent interference between the supported sections 33b, 33c, and the rotary component coupling member 40 and the rotary component. In addition, design flexibility of the rotary component coupling member 40 and the rotary component can be improved.

The rotary component is rotatable around the axle line Q together with the axle 14. The rotary component coupling member 40 is rotatable together with the front wheel 3 at a location that is radially inward relative to the outer peripheral surface of the front wheel 3, when viewed from the axle line Q direction, and configured to transmit the rotation of the front wheel 3 to the rotary component. Although in the present embodiment, the rotary component includes the brake disc 7 and a pulse rotor disc 10 (described later), the rotary component is not limited to these.

The axle 14 is inserted into a region between the pair of axle bearings 44 and the through-hole of the inner member 46, from the first side in the axle line Q direction. The female thread of the ring member 48 is threadingly engaged with the male thread of the reduced-diameter portion 14b of the axle 14, from the second side in the axle line Q direction. This allows the axle 14 and the inner member 46 to be removably (detachably) coupled to the knuckle member 33. By removing (detaching) the ring member 48 from the axle 14 on the second side in the vehicle width direction, the axle 14 can be removed (detached) from the inner member 46 and the knuckle member 33.

In a state in which the inner member 46 is coupled to the axle 14 and the outer member 47 is coupled to the inner member 46, the protruding sections 30a, 30b of the support member 30, the axle support section 33a, the insertion sections 33d, the supported sections 33b, 33c, and the forward extension portion 33r of the angular displacement member coupling section 33f, of the knuckle member 33, are accommodated in the inner space of the outer member 47. In other words, the upward/downward extension portion 33q of the angular displacement member coupling section 33f and a portion of the support member 30 which is other than the protruding sections 30a, 30b of the support member 30 are located in a region outside the inner space of the outer member 47.

As shown in FIG. 5, the motorcycle 1 includes the brake disc 7 and the pulse rotor disc 10. The brake disc 7 is configured to transmit a braking force of the brake caliper 8 to the front wheel 3. The brake disc 7 has an annular shape. The brake disc 7 is disposed on the first side in the vehicle width direction relative to the outer member 47. The brake disc 7 is disposed inward relative to the outer position of the front wheel 3 in the vehicle width direction.

When viewed from the axle line Q direction, the brake disc 7 is disposed radially inward of the outer peripheral surface of the front wheel 3. In a state in which the brake disc 7 is coupled to the outer member 47, the outer peripheral portion of the brake disc 7 is disposed outside the outer peripheral portion of the outer member 47.

The pulse rotor disc 10 is used to calculate traveling speed of the motorcycle 1. The pulse rotor disc 10 has an annular shape. The pulse rotor disc 10 is disposed on the first side in the vehicle width direction relative to the outer member 47. The pulse rotor disc 10 is disposed inward relative to the outer position of the front wheel 3 in the vehicle width direction.

When viewed from the axle line Q direction, the pulse rotor disc 10 is disposed radially inward of the brake disc 7. The pulse rotor disc 10 is rotatable together with the front wheel 3. The pulse rotor disc 10 is disposed on the first side in the vehicle width direction relative to the brake disc 7. The outer peripheral portion of the pulse rotor disc 10 is removably (detachably) coupled to the inner peripheral portion of the brake disc 7 by use of fastening members. In a state in which the pulse rotor disc 10 is coupled to the brake disc 7 and the brake disc 7 is coupled to the outer member 47, the inner peripheral portion of the pulse rotor disc 10 is disposed inward, relative to the inner peripheral portion of the outer member 47.

The pulse rotor disc 10 is provided with a plurality of openings at equal intervals in the circumferential direction. The speed sensor reads the rotational speed of the pulse rotor disc 10 by use of the plurality of openings provided in the pulse rotor disc 10. The pair of protruding sections 30a, 30b of the support member 30 are inserted into the radially inward space of the brake disc 7 and the pulse rotor disc 10, in a direction from the first side in the axle line Q direction toward the second side in the axle line Q direction.

Figure 6:
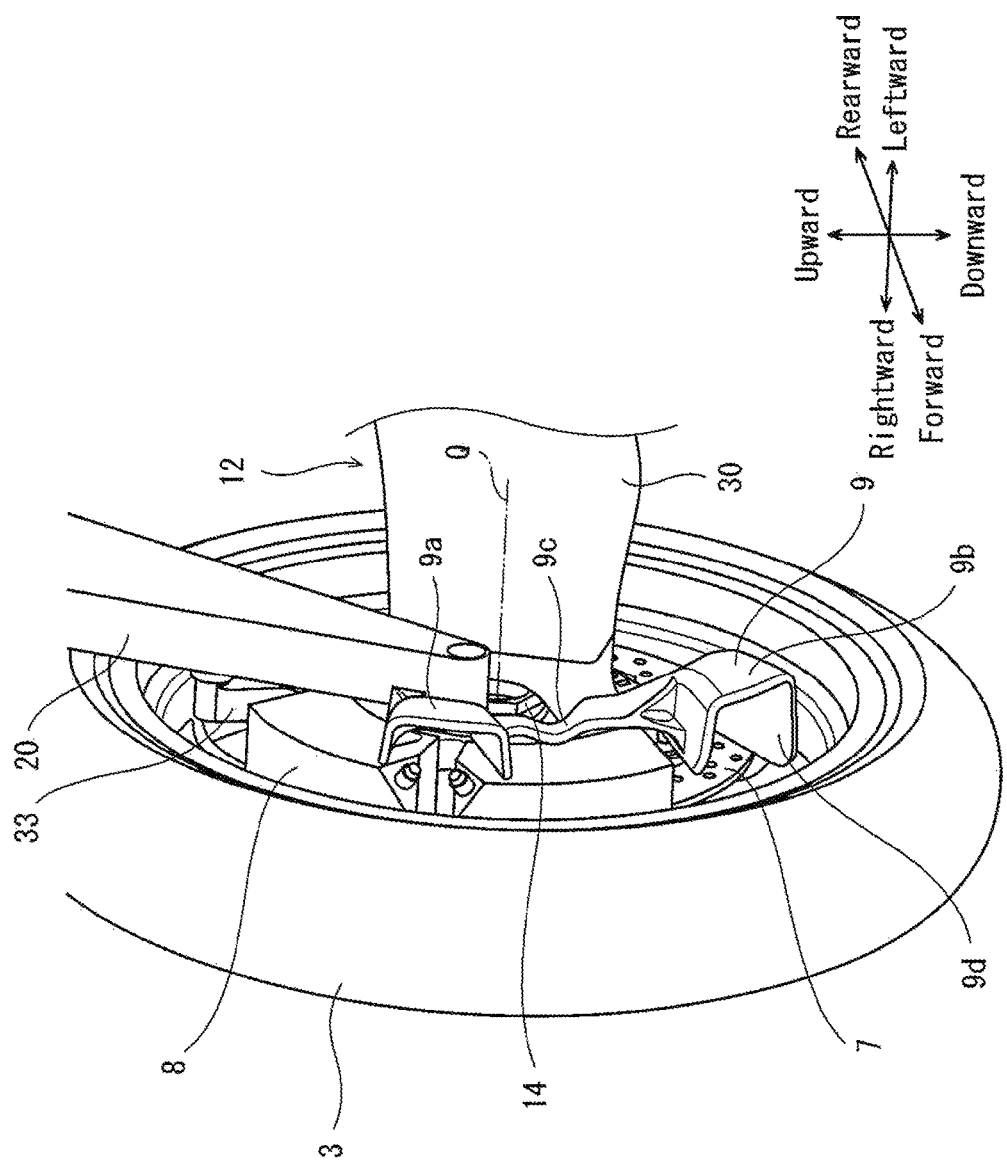
FIG. 6 is a perspective view showing a front wheel of FIG. 1, when viewed from the left and the front.

FIG. 6 is a perspective view showing the front wheel 3 of FIG. 1, when viewed from the left and the front. As shown in FIGS. 1, 5 and 6, the air guide member 9 is disposed forward of the axle 14 and extends in the upward and downward direction. The air guide member 9 is disposed on the first side in the vehicle width direction relative to the brake disc 7.

The air guide member 9 includes a pair of duct sections 9a, 9b (upper duct section 9a and lower duct section 9b), and a connection section 9c. The pair of duct sections 9a, 9b serve to guide the air from a region on the first side in the vehicle width direction relative to the brake disc 7 toward the brake disc 7. Specifically, the pair of duct sections 9a, 9b capture the air flowing from the front to the rear during traveling of the motorcycle 1 and guide the air toward the brake disc 7. In this way, the pair of duct sections 9a, 9b guide the air to the brake disc 7 disposed inward relative to the outer position of the front wheel 3 in the vehicle width direction.

In the present embodiment, the upper duct section 9a is disposed between the first and second brake calipers 8. The lower duct section 9b is disposed below the second brake caliper 8. The connection section 9c is disposed between the pair of duct sections 9a, 9b and connects the pair of duct sections 9a, 9b to each other in the upward and downward direction.

Openings 9d of the upper duct section 9a and the lower duct section 9b face in the forward direction. The upper duct section 9a serves to guide the air to the surface region of the brake disc 7, whose temperature has been elevated due to the contact with the first brake caliper 8. The lower duct section 9b serves to guide the air to the surface region of the brake disc 7 whose temperature has been elevated due to the contact with the second brake caliper 8.

As described above, the wheel 15 is coupled to the rotary component coupling member 40 from the second side in the vehicle width direction, by use of the plurality of bolts B3 inserted into the second, fourth and sixth insertion holes in the direction from the first side in the vehicle width direction toward the second side in the vehicle width direction. Therefore, for example, by loosening the nuts fastened to the bolts B3 from the second side in the vehicle width direction, the front wheel 3 can be easily detached (dismounted) from the rotary component coupling member 40 while preventing interference with the support member 30.

The outer member 47 and the inner member 46 are coupled to each other by the fastening members inserted into the first and third insertion holes. Therefore, even in a case where the front wheel 3 is detached from the rotary component coupling member 40, a coupling state between the inner member 46 and the outer member 47 can be maintained. In other words, in a case where the front wheel 3 is detached from the rotary component coupling member 40, it is not necessary to remove the other constituents.

In a state in which the front wheel 3 is detached from the rotary component coupling member 40, the rotary component coupling member 40 can be detached from the knuckle member 33 in the direction toward the second side in the vehicle width direction. Therefore, for example, in a case where a maintenance work for the front wheel 3, the brake disc 7, the brake calipers 8, and the like is performed, the maintenance work can be performed from the second side in the vehicle width direction, while preventing interference with the support member 30.

Since the upward/downward extension portion 33q of the knuckle member 33 extends from the axle support section 33a toward the first side in the vehicle width direction, a work for mounting and detaching (dismounting) the front wheel 3 can be easily performed, while preventing interference with the angular displacement member.

Figure 7:
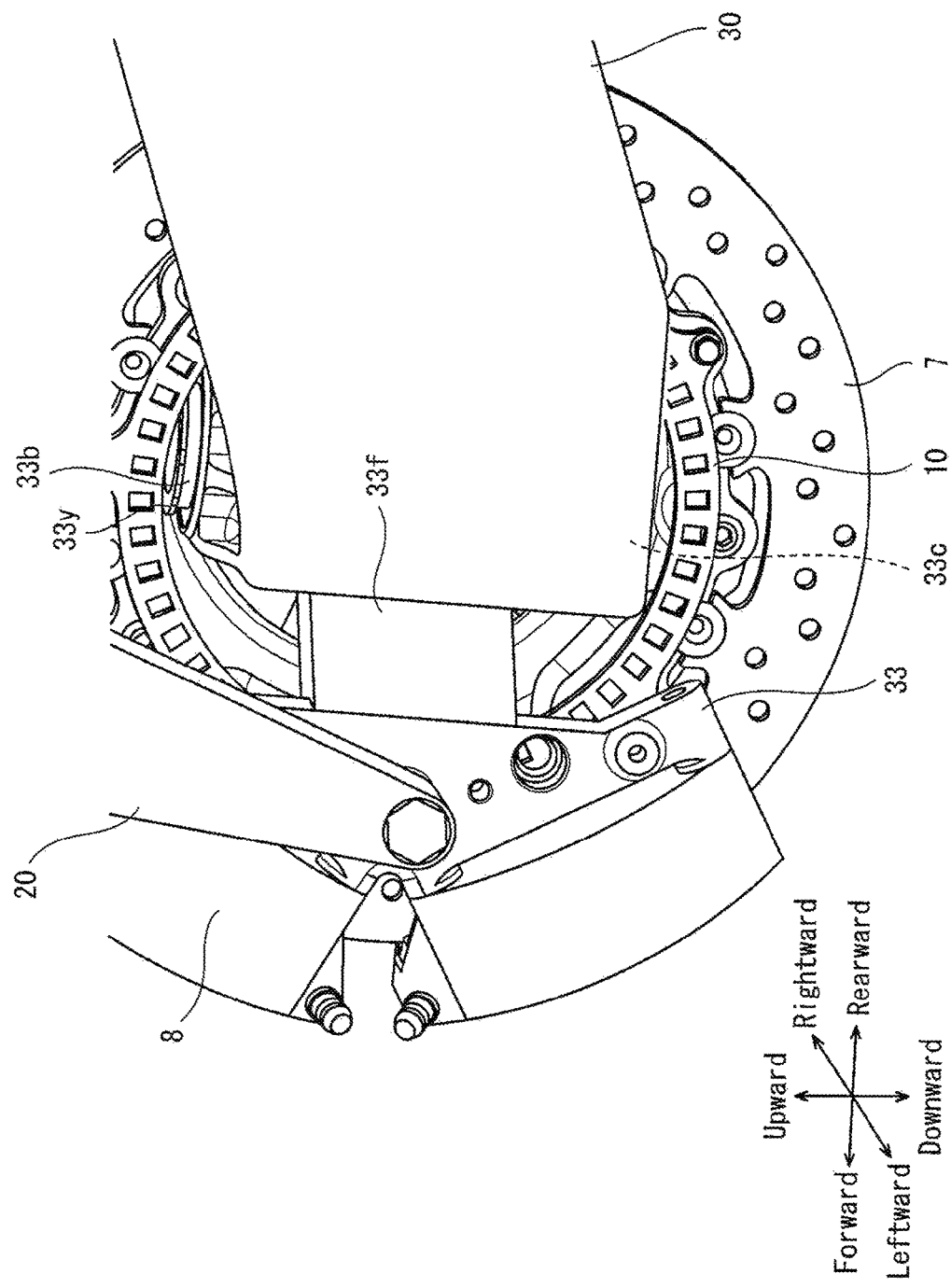
FIG. 7 is a left side view showing a front portion of a support member of FIG. 1.

FIG. 7 is a left side view showing the front portion of the support member 30 of FIG. 1. FIG. 7 shows the knuckle member 33 and the front portion of the support member 30 in a state in which the front wheel 3 and the air guide member 9 are detached (removed). As shown in FIGS. 6 and 7, the knuckle member 33 has a dimension and a shape so that the knuckle member 33 does not interfere with the pulse rotor disc 10. The angular displacement member coupling section 33f extends in such a manner that it is gently curved, from the front side of the axle support section 33a toward the first side in the vehicle width direction. Then, the angular displacement member coupling section 33f extends upward. With this structure, it becomes possible to avoid the angular displacement member coupling section 33f from interfering with the brake disc 7, the pulse rotor disc 10, and the support member 30.

As shown in FIG. 5, the inner surface of the support member 30 in the vehicle width direction is curved outward in the vehicle width direction, in a direction from the front to the rear. This makes it possible to prevent a situation in which a portion of the front wheel 3 which is located rearward of the axle 14, the brake disc 7, the pulse rotor disc 10, and the like interfere with the support member 30, during steering of the front wheel 3.

The outer surface in the vehicle width direction, of the front portion of the support member 30, is inclined outward in the vehicle width direction, as it extends from the front to the rear. This makes it possible to prevent a situation in which the forward extension portion 33r and the upward/downward extension portion 33q of the knuckle member 33, which are located in front of the axle 14, the brake disc 7, the pulse rotor disc 10, and the like interfere with the support member 30, during steering of the front wheel 3.

As shown in FIG. 1, the vehicle body 2 includes a frame structure extending in the forward and rearward direction. The vehicle body 2 includes a head pipe 2a. The head pipe 2a extends in the upward and downward direction, at the front side of the vehicle body 2. A steering stem 16 (see FIG. 8) of the steering member 6 is inserted into the head pipe 2a. The driving power source 5 is mounted on the vehicle body 2.

Figure 8:
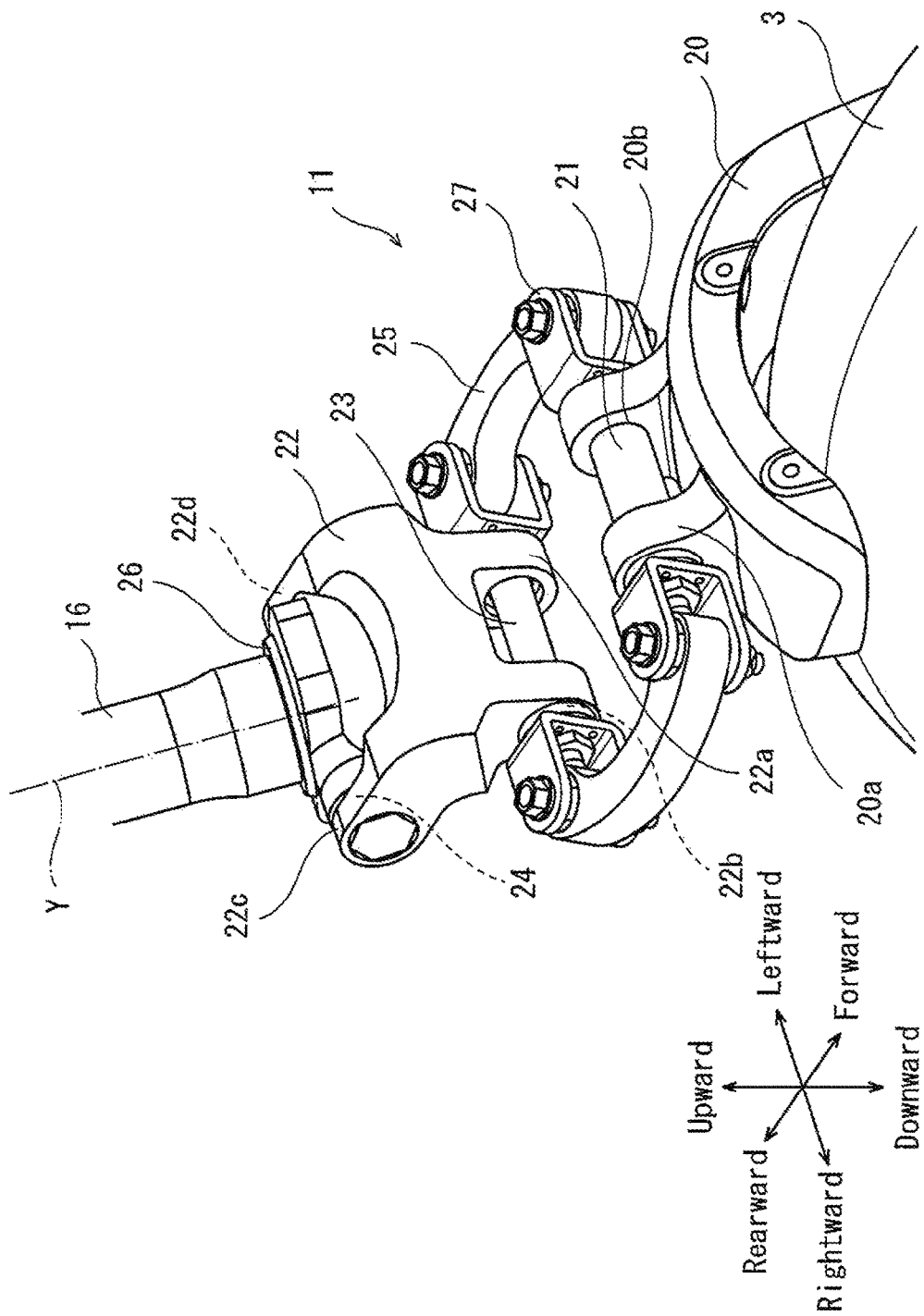
FIG. 8 is a perspective view showing the motorcycle of FIG. 1, when viewed from the right and the front.

FIG. 8 is a perspective view showing the motorcycle 1 of FIG. 1, when viewed from the right and the front. As shown in FIGS. 1 and 8, the motorcycle 1 includes the steering mechanism 11, the front wheel support structure 12, and a handle 18. The handle 18 is coupled to the steering member 6.

The steering mechanism 11 is apart from the support member 30. The steering mechanism 11 is used to steer the front wheel 3. The steering mechanism 11 includes the steering member 6, a first arm member 20, a first shaft member 21, a first coupling member 22, a second shaft member 23, a third shaft member 24, a pair of second arm members 25, and a second coupling member 26.

The steering member 6 includes the steering stem 16. The steering stem 16 extends in the upward and downward direction. The steering stem 16 is supported by the head pipe 2a in such a manner that the steering stem 16 is rotatable within a predetermined range around an axis line (hereinafter will be referred to as a stem axis line Y) of the head pipe 2a. The lower end of the steering stem 16 is coupled to the steering mechanism 11. The handle 18 is rotated within the predetermined range around the stem axis line Y together with the steering stem 16, and thus the front wheel 3 is steered.

The first arm member 20 is coupled to the upward/downward extension portion 33q of the angular displacement member coupling section 33f. The first arm member 20 extends in the upward and downward direction, on the first side in the vehicle width direction relative to the brake disc 7. The first arm member 20 also extends from the first side in the vehicle width direction toward the second side in the vehicle width direction, in a region above the front wheel 3. When viewed from the axle line Q direction, the first arm member 20 is inclined in the rearward direction as it extends in the upward direction. The first arm member 20 and the first brake caliper 8 extend in the same direction. The lower portion of the first arm member 20 is coupled to the upper portion of the upward/downward extension portion 33q. A mud guard (front fender) of the front wheel 3 is coupled to the upper portion of the first arm member 20.

A pair of coupling sections 20a are provided at the upper portion of the first arm member 20 in such a manner that the coupling sections 20a are spaced apart from each other in the axle line Q direction. The pair of coupling sections 20a are formed with insertion holes 20b, respectively, extending in the axle line Q direction. The first shaft member 21 is inserted into the insertion holes 20b in such a manner that the first shaft member 21 is rotatable around its axis. Brackets 27 are coupled to the both ends of the first shaft member 21.

The first coupling member 22 extends in the upward and downward direction, at a location that is rearward of the first arm member 20. A pair of coupling sections 22a are provided at the lower end of the first coupling member 22 in such a manner that the coupling sections 22a are spaced apart from each other in the axle line Q direction. The pair of coupling sections 22a are formed with insertion holes 22b, respectively, extending in the axle line Q direction. The second shaft member 23 is inserted into the insertion holes 22b in parallel with the first shaft member 21 in such a manner that the second shaft member 23 is rotatable around its axis. Brackets 27 are coupled to the both ends, respectively, of the second shaft member 23.

A pair of coupling sections 22c are provided at the upper end of the first coupling member 22 in such a manner that the coupling sections 22c are spaced apart from each other in the axle line Q direction. The coupling sections 22c are formed with insertion holes 22d extending in the axle line Q direction. The third shaft member 24 is inserted into the insertion holes 22d in parallel with the first shaft member 21 in such a manner that the third shaft member 24 is rotatable around its axis.

The pair of second arm members 25 extend in the forward and rearward direction in a region between the first arm member 20 and the first coupling member 22 in such a manner that the second arm members 25 are spaced apart from each other in the axle line Q direction. The front ends of the pair of second arm members 25 are coupled to the brackets 27, respectively, provided at the both ends of the first shaft member 21. The rear ends of the pair of second arm members 25 are coupled to the brackets 27 provided at the both ends, respectively, of the second shaft member 23, respectively.

The lengthwise direction of the pair of second arm members 25, and the axial directions of the first shaft member 21 and the second shaft member 23 are along the same plane. When viewed from a direction perpendicular to this plane, the pair of second arm members 25 are coupled to the brackets 27, respectively, in such a manner that the second arm members 25 are angularly displaceable within this plane. When viewed from the axle line Q direction, a coupling portion P at which the first arm member 20 is coupled to the second arm members 25 is located on the steering axis line X.

The second coupling member 26 extends in the axle line Q direction, in a region between the pair of coupling sections 22c. The second coupling member 26 is inserted into the third shaft member 24 in such a manner that the second coupling member 26 is rotatable around the axis of the third shaft member 24. The upper portion of the second coupling member 26 is coupled to the lower end of the steering stem 16.

When the steering stem 16 is rotated around the stem axis line Y together with the handle 18, the pair of second arm members 25 are angularly displaced with respect the brackets 27, respectively, within the above-described plane, the steering torque provided by the rider to the steering stem 16 is transmitted to the second coupling member 26, the first coupling member 22, the pair of second arm members 25, and the first arm member 20 in this order, and the steering mechanism 11 is rotated around the stem axis line Y together with the steering stem 16 in the same direction. According to this rotation, the steering torque provided by the rider is transmitted to the front wheel 3, and the front wheel 3 is steered around the steering axis line X.

The center of rotation of the first shaft member 21 and the center of rotation of the second shaft member 23 in a case where the steering mechanism 11 is rotated around the stem axis line Y are located on a plane including the steering axis line X and being perpendicular to the vehicle width direction. The center of rotation of the first shaft member 21 is set to be shifted within a plane perpendicular to the vehicle width direction. The first arm member 20 is provided so that the center of rotation of the first shaft member 21 is located on the steering axis line X.

When viewed from the axle line Q direction, the coupling portion P is located on the steering axis line X. In this configuration, it becomes possible to prevent a situation in which the first arm member 20 is deformed or distorted in a region between a lowermost portion of the first arm member 20 which is coupled to the knuckle member 33 and portions of the first arm member 20 at which the pair of coupling sections 20a are provided, during steering of the front wheel 3. In this way, in the motorcycle 1, the front wheel 3 can be steered with low torque.

Since the steering mechanism 11 has the parallel link structure, deformation or distortion of the first arm member 20 can be prevented compared to a case where the steering mechanism 11 has a cantilever link structure. Therefore, the front wheel 3 can be easily steered according to the rider's handle operation.

In a case where an external force is applied to the front wheel 3 in the upward and downward direction, the shape of the steering mechanism 11 is changed so that an angle of a coupling portion at which the first arm member 20 is coupled to the second arm members 25 is changed around the axis of the first shaft member 21, an angle of a coupling portion at which the second arm members 25 are coupled to the first coupling member 22 is changed around the axis of the second shaft member 23, and an angle of a coupling portion at which the first coupling member 22 is coupled to the second coupling member 26 is changed around the axis of the third shaft member 24. Thus, even in a case where the external force is applied to the front wheel 3 in the upward and downward direction, the front wheel 3 can be stably steered by the steering mechanism 11.

By changing a ratio of a length between the first shaft member 21 and the second shaft member 23, it becomes possible to adjust the amount of rotation of the front wheel 3 around the steering axis line X in a case where the handle 18 is rotated to a certain amount around the stem axis line Y. For example, in a case where the length of the first shaft member 21 and the length of the second shaft member 23 are set to an almost equal value, the amount of rotation of the handle 18 in a case where the handle 18 is rotated to a certain amount around the stem axis line Y and the amount of rotation of the front wheel 3 around the steering axis line X can be set to an almost equal value.

If the length of the first shaft member 21 is set shorter than the length of the second shaft member 23, it becomes possible to reduce the amount of rotation of the front wheel 3 around the steering axis line X, corresponding to the amount of rotation of the handle 18 in a case where the handle 18 is rotated to a certain amount around the stem axis line Y If the length of the first shaft member 21 is set longer than the length of the second shaft member 23, it becomes possible to increase the amount of rotation of the front wheel 3 around the steering axis line X, corresponding to the amount of rotation of the handle 18 in a case where the handle 18 is rotated to a certain amount around the stem axis line Y.

The front wheel support structure 12 is a steered wheel support structure of the motorcycle 1. As shown in FIG. 1, specifically, the front wheel support structure 12 includes the support member 30, the pair of link mechanisms 31, a damper member 32, and the knuckle member 33.

The pair of link mechanisms 31 are disposed on both sides of the vehicle body 2 in the vehicle width direction. The pair of link mechanisms 31 are coupled to the vehicle body 2 and support the support member 30. Each of the pair of link mechanisms 31 includes a pair of third arm members 35, a pair of fourth arm members 36, a rod member 37, and a bell crank member 38.

The pair of third arm members 35 are arranged on an upper side and a lower side, respectively, and extend from the rear end of the support member 30 in the forward and rearward direction. When viewed from the vehicle width direction, the rear ends of the pair of third arm members 35 are coupled to the front ends of the pair of fourth arm members 36, respectively in such a manner that the pair of third arm members 35 is angularly displaceable.

The pair of fourth arm members 36 are arranged on an upper side and a lower side, respectively. The front ends of the pair of fourth arm members 36 are coupled to the rear ends of the pair of third arm members 35, respectively in such a manner that the pair of fourth arm members 36 are angularly displaceable, when viewed from the vehicle width direction. The pair of fourth arm members 36 extend in the forward and rearward direction. The rear ends of the pair of fourth arm members 36 are coupled to the vehicle body 2 in such a manner that the pair of fourth arm members 36 are angularly displaceable, when viewed from the vehicle width direction.

The rod member 37 extends in the upward and downward direction, at a location that is above the support member 30. When viewed from the vehicle width direction, the lower end of the rod member 37 is coupled to the rear end of the upper third arm members 35 in such a manner that the rod member 37 is angularly displaceable. The upper end of the rod member 37 is coupled to one end of the bell crank member 38 in such a manner that the rod member 37 is angularly displaceable, when viewed from the vehicle width direction.

When viewed from the front of the vehicle body 2, a first end of the bell crank member 38 is supported by the vehicle body 2 in such a manner that the bell crank member 38 is angularly displaceable. When viewed from the front of the vehicle body 2, a second end of the bell crank member 38 is coupled to a first end of the damper member 32 in a lengthwise direction in such a manner that the bell crank member 38 is angularly displaceable. The damper member 32 is disposed above the support member 30 and is extendable and contractible.

In each of the pair of link mechanisms 31, in a case where an external force is applied to the front wheel 3 in the upward and downward direction, the support member 30 is pivotable upward and downward around the above-described pivot axis line, from portions of the pair of fourth arm members 36 which are coupled to the vehicle body 2, together with the pair of third arm members 35 and the pair of fourth arm members 36.

In a case where an upward external force is applied to the front wheel 3, and the rod member 37 is pushed in the upward direction by the upper third arm member 35, the portion of the bell crank member 38 which is supported by the vehicle body 2 is angularly displaceable relative to the vehicle body 2, and the bell crank member 38 compresses the damper member 32. In this way, an impact generated by the external force applied to the front wheel 3 is buffered (mitigated) by the damper member 32. The support member 30 may be indirectly coupled to the vehicle body 2 via a mechanism or members which are other than the link mechanisms 31, or directly coupled to the vehicle body 2.

Modified Example

The present invention is not limited to the above-described embodiment, and the configuration can be changed, added or deleted within the scope of the invention. The first side in the vehicle width direction and the first side in the axle line Q direction may be the right side of the motorcycle 1, and the second side in the vehicle width direction and the second side in the axle line Q direction may be the left side of the motorcycle 1.

The steering axis line X may extend in the upward and downward direction at a location that is in front of the axle line Q. The steering axis line X may extend in the vertical direction. The axle line Q and the steering axis line X may cross each other.

The steered wheel is not limited to the front wheel of the vehicle. The vehicle is not limited to the straddle vehicle (straddle-type vehicle). The vehicle may be an electric vehicle. In a case where the vehicle is the electric vehicle, the electric vehicle may include an in-wheel motor. The vehicle may have a structure in which the driving power source 5 is supported by the vehicle body 2 in such a manner that the driving power source 5 is pivotable upward and downward. The driving power source 5 may be an electric motor which generates driving power for allowing the straddle vehicle to travel, or may include an engine which generates driving power for allowing the straddle vehicle to travel and the electric motor.

The number of brake calipers 8 may be one. The pulse rotor disc 10 may be omitted. The steering mechanism 11 may have a structure different from the above-described structure. For example, the steering mechanism 11 may have a structure in which the knuckle member 33 is angularly displaced around the steering axis line X, by a wire via which the rotation of the handle 18 around the stem axis line Y is transmitted to the knuckle member 33, or may include a link mechanism including the constituents different from the constituents 20 to 27.

The front wheel support structure 12 is not limited to a structure of a hub steering type. For example, the front wheel support structure 12 may be a structure of a swing arm type, including a swing arm pivotally mounted on the vehicle body 2, or a structure of a front fork type, including front forks extending in the upward and downward direction, instead of the link mechanism.

The axle 14 may be a solid shaft member. The axle 14 and the wheel 15 may be integrated. The bolts B3 may be inserted into the sixth, fourth, and second insertion holes, from the second side in the vehicle width direction toward the first side in the vehicle width direction. In this case, the head portion of the bolt B3 may be accommodated in the depressed region of the mounting section 15a. At least one of a brake hose and the wire of the speed sensor may be secured to the first arm member 20.

The support member 30 may support the front wheel 3 from both sides in the vehicle width direction. The support member 30 may have a structure for supporting the knuckle member 33 from both sides in the vehicle width direction. The support member 30 may be directly connected to the vehicle body 2.

At least one of the two supported sections 33b, 33c may be integrated with the support member 30. In this case, it is necessary to provide in the knuckle member 33 a support section which supports the supported section integrated with the support member 30, of the two supported sections 33b, 33c in such a manner that the supported section is angularly displaceable around the steering axis line X.

At least one of the two supported sections 33b, 33c may not overlap with the axle 14 in the forward and rearward direction, when viewed from the upward and downward direction, or may overlap with the axle support section 33a in the forward and rearward direction, when viewed from the upward and downward direction.

The number of the displacement inhibiting elements is not limited to two and may be one. The present invention includes a case where the displacement inhibiting elements and displacement inhibiting structures for inhibiting displacement of the two supported sections 33b, 33c with respect to the axle support section 33a are omitted, so long as the two supported sections 33b, 33c can be firmly fastened to the insertion sections 33d, respectively, without using the displacement inhibiting elements.

The bearing structure provided in the vehicle may have another known structure different from the structure described above. The steering bearings 45 may not be fitted into the protruding sections 30a, 30b of the support member 30 and may be fitted into the knuckle member 33. In this case, for example, a shaft portion extending in the steering axis line X direction toward the axle 14 may be provided at at least one of the protruding sections 30a, 30b, and the outer peripheral surface of this shaft portion may be secured to the inner side of the steering bearing 45.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of conveying out the invention. The details of the structure and/or function may be varied substantially without departing from the spirit of the invention.

The invention claimed is:

1. A steered wheel support structure of a vehicle, the steered wheel support structure comprising:
   a knuckle member which supports an axle of a steered wheel in such a manner that the axle is rotatable around an axle line; and
   a support member which is coupled to a vehicle body and supports the knuckle member from a first side in a vehicle width direction in such a manner that the knuckle member is angularly displaceable around a steering axis line extending in an upward and downward direction,
   wherein the knuckle member includes:
   an axle support section which supports the axle; and
   two supported sections which are disposed on both sides in the upward and downward direction, of at least a portion of the axle support section, the two supported sections facing each other and being spaced apart from each other in the upward and downward direction, and
   wherein the two supported sections are supported by the support member in such a manner that the two supported sections are angularly displaceable around the steering axis line, relative to the support member.

2. The steered wheel support structure of the vehicle, according to claim 1,
   wherein the two supported sections include an upper supported section and a lower supported section,
   wherein the upper supported section extends upward from the axle support section along the steering axis line,
   wherein the lower supported section extends downward from the axle support section along the steering axis line, and
   wherein the upper supported section and the lower supported section are supported by the support member by use of bearings, respectively, which are placed coaxially with the steering axis line in such a manner that the upper supported section and the lower supported section are angularly displaceable around the steering axis line.

3. The steered wheel support structure of the vehicle, according to claim 2,
   wherein at least one of the two supported sections is removably mounted on the axle support section.

4. The steered wheel support structure of the vehicle, according to claim 3,
   wherein the knuckle member includes at least one insertion section into which at least one of the two supported sections is insertable in a steering axis line direction.

5. The steered wheel support structure of the vehicle, according to claim 3,
   wherein a displacement inhibiting element is attached on the knuckle member, from a second side in the vehicle width direction, to inhibit at least one of the two supported sections mounted on the axle support section from being displaced with respect to the axle support section.

6. The steered wheel support structure of the vehicle, according to claim 1, further comprising:
   a rotary component coupling member including an axle coupling section coupled to the axle, and a rotary component coupling section to which a rotary component rotatable around the axle line together with the axle is coupled, the rotary component coupling section being connected to the axle coupling section,
   wherein the two supported sections are disposed inward in a radial direction of the axle, relative to the rotary component coupling member and the rotary component.

7. The steered wheel support structure of the vehicle, according to claim 6,
   wherein the support member supports the knuckle member in a cantilever manner from the first side in the vehicle width direction,
   wherein the rotary component coupling member includes a steered wheel coupling section to which the steered wheel is coupled, and
   wherein the steered wheel is removably coupled to the steered wheel coupling section, from a second side in the vehicle width direction.

8. The steered wheel support structure of the vehicle, according to claim 1,
   wherein the knuckle member includes an angular displacement member coupling section to which an angular displacement member is coupled, the angular displacement member being angularly displaceable around the steering axis line together with the knuckle member, and
   wherein the angular displacement member coupling section extends from the axle support section to the first side in the vehicle width direction.

* * * * *